United States Patent
Nasiri et al.

(10) Patent No.: US 8,997,564 B2
(45) Date of Patent: *Apr. 7, 2015

(54) INTEGRATED MOTION PROCESSING UNIT (MPU) WITH MEMS INERTIAL SENSING AND EMBEDDED DIGITAL ELECTRONICS

(75) Inventors: Steven S. Nasiri, Saratoga, CA (US); David Sachs, New York, NY (US); Babak Taheri, San Francisco, CA (US)

(73) Assignee: Invensense, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/492,717

(22) Filed: Jun. 8, 2012

(65) Prior Publication Data

US 2012/0253738 A1  Oct. 4, 2012

Related U.S. Application Data

(63) Continuation of application No. 11/774,488, filed on Jul. 6, 2007, now Pat. No. 8,250,921.

(51) Int. Cl.
*G01P 1/02* (2006.01)
*G01P 15/00* (2006.01)
*G01P 15/18* (2013.01)
(Continued)

(52) U.S. Cl.
CPC ............. *G01P 15/18* (2013.01); *G01P 1/023* (2013.01); *G01P 15/0802* (2013.01); *G01P 15/125* (2013.01); *G01C 19/5769* (2013.01); *G01P 2015/0845* (2013.01); *G01P 2015/0865* (2013.01); *G01P 2015/088* (2013.01)

(58) Field of Classification Search
USPC .................................. 73/493, 510, 511, 497
See application file for complete search history.

(56) References Cited

U.S. PATENT DOCUMENTS

| | | | |
|---|---|---|---|
| 4,303,978 A | 12/1981 | Shaw et al. | |
| 4,510,802 A | 4/1985 | Peters | |

(Continued)

FOREIGN PATENT DOCUMENTS

| | | |
|---|---|---|
| CN | 1722063 A | 1/2006 |
| CN | 1853158 A | 10/2006 |

(Continued)

OTHER PUBLICATIONS

Roberto Oboe, et al., "MEMS-based Accelerometers and their Application to Vibration Suppression in Hard Dish Drives," MEMS/NEMS Handbook Techniques and Application, vol. 4, Springer 2006, pp. 1-29 see pp. 7-22, Dec. 31, 2006.

(Continued)

*Primary Examiner* — Helen Kwok
(74) *Attorney, Agent, or Firm* — Sawyer Law Group, P.C.

(57) ABSTRACT

A module operable to be mounted onto a surface of a board. The module includes a linear accelerometer to provide a first measurement output corresponding to a measurement of linear acceleration in at least one axis, and a first rotation sensor operable to provide a second measurement output corresponding to a measurement of rotation about at least one axis. The accelerometer and the first rotation sensor are formed on a first substrate. The module further includes an application specific integrated circuit (ASIC) to receive both the first measurement output from the linear accelerometer and the second measurement output from the first rotation sensor. The ASIC includes an analog-to-digital converter and is implemented on a second substrate. The first substrate is vertically bonded to the second substrate.

35 Claims, 13 Drawing Sheets

(51) Int. Cl.
   *G01P 15/08* (2006.01)
   *G01P 15/125* (2006.01)
   *G01C 19/5769* (2012.01)

(56) References Cited

U.S. PATENT DOCUMENTS

| | | | |
|---|---|---|---|
| 4,601,206 A | 7/1986 | Watson |
| 4,736,629 A | 4/1988 | Cole |
| 4,783,742 A | 11/1988 | Peters |
| 4,841,773 A | 6/1989 | Stewart |
| 5,083,466 A | 1/1992 | Holm-Kennedy et al. |
| 5,128,671 A | 7/1992 | Thomas, Jr. |
| 5,251,484 A | 10/1993 | Mastache |
| 5,313,835 A | 5/1994 | Dunn |
| 5,349,858 A | 9/1994 | Yagi et al. |
| 5,359,893 A | 11/1994 | Dunn |
| 5,367,631 A | 11/1994 | Levy |
| 5,392,650 A | 2/1995 | O'Brien et al. |
| 5,396,797 A | 3/1995 | Hulsing, II |
| 5,415,040 A | 5/1995 | Nottmeyer |
| 5,415,060 A | 5/1995 | DeStefano, Jr. |
| 5,433,110 A | 7/1995 | Gertz et al. |
| 5,440,326 A | 8/1995 | Quinn |
| 5,444,639 A | 8/1995 | White |
| 5,511,419 A | 4/1996 | Dunn |
| 5,541,860 A | 7/1996 | Takei et al. |
| 5,574,221 A | 11/1996 | Park et al. |
| 5,581,484 A | 12/1996 | Prince |
| 5,629,988 A | 5/1997 | Burt et al. |
| 5,635,638 A | 6/1997 | Geen |
| 5,635,639 A | 6/1997 | Greiff et al. |
| 5,698,784 A | 12/1997 | Hotelling et al. |
| 5,703,293 A | 12/1997 | Zabler et al. |
| 5,703,623 A | 12/1997 | Hall et al. |
| 5,723,790 A | 3/1998 | Andersson |
| 5,734,373 A | 3/1998 | Rosenberg et al. |
| 5,780,740 A | 7/1998 | Lee et al. |
| 5,817,942 A | 10/1998 | Greiff |
| 5,825,350 A | 10/1998 | Case, Jr. et al. |
| 5,831,162 A | 11/1998 | Sparks et al. |
| 5,868,031 A | 2/1999 | Kokush et al. |
| 5,895,850 A | 4/1999 | Buestgens |
| 5,898,421 A | 4/1999 | Quinn |
| 5,955,668 A | 9/1999 | Hsu et al. |
| 5,959,209 A | 9/1999 | Takeuchi et al. |
| 5,992,233 A | 11/1999 | Clark |
| 5,996,409 A * | 12/1999 | Funk et al. ............... 73/504.04 |
| 6,018,998 A | 2/2000 | Zunino et al. |
| 6,060,336 A | 5/2000 | Wan |
| 6,067,858 A | 5/2000 | Clark et al. |
| 6,082,197 A | 7/2000 | Mizuno et al. |
| 6,122,195 A | 9/2000 | Estakhri et al. |
| 6,122,961 A | 9/2000 | Geen et al. |
| 6,122,965 A | 9/2000 | Seidel et al. |
| 6,134,961 A | 10/2000 | Touge et al. |
| 6,158,280 A | 12/2000 | Nonomura et al. |
| 6,159,761 A | 12/2000 | Okada |
| 6,167,757 B1 | 1/2001 | Yazdi et al. |
| 6,168,965 B1 | 1/2001 | Malinovich et al. |
| 6,189,381 B1 | 2/2001 | Huang et al. |
| 6,192,756 B1 | 2/2001 | Kikuchi et al. |
| 6,230,564 B1 | 5/2001 | Matsunaga et al. |
| 6,250,156 B1 | 6/2001 | Seshia et al. |
| 6,250,157 B1 | 6/2001 | Touge |
| 6,257,059 B1 | 7/2001 | Weinberg et al. |
| 6,269,254 B1 | 7/2001 | Mathis |
| 6,279,043 B1 | 8/2001 | Hayward et al. |
| 6,292,170 B1 | 9/2001 | Chang et al. |
| 6,343,349 B1 | 1/2002 | Braun et al. |
| 6,370,937 B2 | 4/2002 | Hsu |
| 6,374,255 B1 | 4/2002 | Peurach et al. |
| 6,386,033 B1 | 5/2002 | Negoro |
| 6,391,673 B1 | 5/2002 | Ha et al. |
| 6,393,914 B1 | 5/2002 | Zarabadi et al. |
| 6,424,356 B2 | 7/2002 | Chang et al. |
| 6,429,895 B1 | 8/2002 | Onuki |
| 6,430,998 B2 | 8/2002 | Kawai et al. |
| 6,456,939 B1 | 9/2002 | McCall et al. |
| 6,480,320 B2 | 11/2002 | Nasiri |
| 6,481,283 B1 | 11/2002 | Cardarelli |
| 6,481,284 B2 | 11/2002 | Geen et al. |
| 6,481,285 B1 | 11/2002 | Shkel et al. |
| 6,487,369 B1 | 11/2002 | Sato |
| 6,487,908 B2 | 12/2002 | Geen et al. |
| 6,494,096 B2 | 12/2002 | Sakai et al. |
| 6,508,122 B1 | 1/2003 | McCall et al. |
| 6,508,125 B2 | 1/2003 | Otani |
| 6,512,478 B1 | 1/2003 | Chien |
| 6,513,380 B2 | 2/2003 | Reeds, III et al. |
| 6,520,017 B1 | 2/2003 | Schoefthaler et al. |
| 6,533,947 B2 | 3/2003 | Nasiri et al. |
| 6,538,296 B1 | 3/2003 | Wan |
| 6,573,883 B1 | 6/2003 | Bartlett |
| 6,603,420 B1 | 8/2003 | Lu |
| 6,636,521 B1 | 10/2003 | Giulianelli |
| 6,646,289 B1 | 11/2003 | Badehi |
| 6,647,352 B1 | 11/2003 | Horton |
| 6,666,092 B2 | 12/2003 | Zarabadi et al. |
| 6,668,614 B2 | 12/2003 | Itakura |
| 6,671,648 B2 | 12/2003 | McCall et al. |
| 6,718,823 B2 | 4/2004 | Platt |
| 6,720,994 B1 | 4/2004 | Grottodden et al. |
| 6,725,719 B2 | 4/2004 | Cardarelli |
| 6,729,176 B2 | 5/2004 | Begin |
| 6,738,721 B1 | 5/2004 | Drucke et al. |
| 6,758,093 B2 | 7/2004 | Tang et al. |
| 6,794,272 B2 | 9/2004 | Turner et al. |
| 6,796,178 B2 | 9/2004 | Jeong et al. |
| 6,823,733 B2 | 11/2004 | Ichinose |
| 6,834,249 B2 | 12/2004 | Orchard |
| 6,843,126 B2 | 1/2005 | Hulsing, II |
| 6,843,127 B1 | 1/2005 | Chiou |
| 6,845,669 B2 | 1/2005 | Acar et al. |
| 6,848,304 B2 | 2/2005 | Geen |
| 6,859,751 B2 | 2/2005 | Cardarelli |
| 6,860,150 B2 | 3/2005 | Cho |
| 6,876,093 B2 | 4/2005 | Goto et al. |
| 6,891,239 B2 | 5/2005 | Anderson et al. |
| 6,892,575 B2 | 5/2005 | Nasiri et al. |
| 6,915,693 B2 | 7/2005 | Kim et al. |
| 6,918,297 B2 | 7/2005 | MacGugan |
| 6,918,298 B2 | 7/2005 | Park |
| 6,938,484 B2 | 9/2005 | Najafi et al. |
| 6,939,473 B2 | 9/2005 | Nasiri et al. |
| 6,952,965 B2 | 10/2005 | Kang et al. |
| 6,955,086 B2 | 10/2005 | Yoshikawa et al. |
| 6,963,345 B2 | 11/2005 | Boyd et al. |
| 6,972,480 B2 | 12/2005 | Zilber et al. |
| 6,981,416 B2 | 1/2006 | Chen et al. |
| 6,985,134 B2 | 1/2006 | Suprun et al. |
| 7,004,025 B2 | 2/2006 | Tamura |
| 7,007,550 B2 | 3/2006 | Sakai et al. |
| 7,026,184 B2 | 4/2006 | Xie et al. |
| 7,028,546 B2 | 4/2006 | Hoshal |
| 7,028,547 B2 | 4/2006 | Shiratori et al. |
| 7,036,372 B2 | 5/2006 | Chojnacki et al. |
| 7,040,163 B2 | 5/2006 | Shcheglov et al. |
| 7,040,922 B2 | 5/2006 | Harney et al. |
| 7,043,985 B2 | 5/2006 | Ayazi et al. |
| 7,057,645 B1 | 6/2006 | Hara et al. |
| 7,077,007 B2 | 7/2006 | Rich et al. |
| 7,093,487 B2 | 8/2006 | Mochida |
| 7,104,129 B2 | 9/2006 | Nasiri et al. |
| 7,106,184 B2 | 9/2006 | Kaminaga et al. |
| 7,121,141 B2 | 10/2006 | McNeil |
| 7,144,745 B2 | 12/2006 | Badehi |
| 7,154,477 B1 | 12/2006 | Hotelling et al. |
| 7,155,975 B2 | 1/2007 | Mitani et al. |
| 7,158,118 B2 | 1/2007 | Liberty |
| 7,159,442 B1 | 1/2007 | Jean |
| 7,168,317 B2 | 1/2007 | Chen et al. |
| 7,180,500 B2 | 2/2007 | Marvit et al. |
| 7,196,404 B2 | 3/2007 | Schirmer et al. |
| 7,209,810 B2 | 4/2007 | Meyer et al. |

(56) References Cited

U.S. PATENT DOCUMENTS

| | | |
|---|---|---|
| 7,210,351 B2 | 5/2007 | Lo et al. |
| 7,219,033 B2 | 5/2007 | Kolen |
| 7,222,533 B2 | 5/2007 | Mao et al. |
| 7,234,351 B2 | 6/2007 | Perkins |
| 7,236,156 B2 | 6/2007 | Liberty et al. |
| 7,237,169 B2 | 6/2007 | Smith |
| 7,237,437 B1 | 7/2007 | Fedora |
| 7,239,301 B2 | 7/2007 | Liberty et al. |
| 7,239,342 B2 | 7/2007 | Kingetsu et al. |
| 7,240,552 B2 | 7/2007 | Acar et al. |
| 7,243,561 B2 | 7/2007 | Ishigami et al. |
| 7,247,246 B2 | 7/2007 | Nasiri et al. |
| 7,250,112 B2 | 7/2007 | Nasiri et al. |
| 7,250,322 B2 | 7/2007 | Christenson et al. |
| 7,253,079 B2 | 8/2007 | Hanson et al. |
| 7,257,273 B2 | 8/2007 | Li et al. |
| 7,258,008 B2 | 8/2007 | Durante et al. |
| 7,258,011 B2 | 8/2007 | Nasiri et al. |
| 7,258,012 B2 | 8/2007 | Xie |
| 7,260,789 B2 | 8/2007 | Hunleth et al. |
| 7,262,760 B2 | 8/2007 | Liberty |
| 7,263,883 B2 | 9/2007 | Park et al. |
| 7,284,430 B2 | 10/2007 | Acar et al. |
| 7,289,898 B2 | 10/2007 | Hong et al. |
| 7,290,435 B2 | 11/2007 | Seeger et al. |
| 7,296,471 B2 | 11/2007 | Ono et al. |
| 7,299,695 B2 | 11/2007 | Tanaka et al. |
| 7,307,653 B2 | 12/2007 | Dutta |
| 7,320,253 B2 | 1/2008 | Hanazawa et al. |
| 7,325,454 B2 | 2/2008 | Saito et al. |
| 7,331,212 B2 * | 2/2008 | Manlove et al. ............ 73/12.01 |
| 7,333,087 B2 | 2/2008 | Soh et al. |
| 7,352,567 B2 | 4/2008 | Hotelling et al. |
| 7,365,736 B2 | 4/2008 | Marvit et al. |
| 7,377,167 B2 | 5/2008 | Acar et al. |
| 7,386,806 B2 | 6/2008 | Wroblewski |
| 7,395,181 B2 | 7/2008 | Foxlin |
| 7,398,683 B2 | 7/2008 | Lehtonen |
| 7,414,611 B2 | 8/2008 | Liberty |
| 7,421,897 B2 | 9/2008 | Geen et al. |
| 7,421,898 B2 | 9/2008 | Acar et al. |
| 7,424,213 B2 | 9/2008 | Imada |
| 7,437,931 B2 | 10/2008 | Dwyer et al. |
| 7,442,570 B2 | 10/2008 | Nasiri et al. |
| 7,454,971 B2 | 11/2008 | Blomqvist |
| 7,458,263 B2 | 12/2008 | Nasiri et al. |
| 7,474,296 B2 | 1/2009 | Obermeyer et al. |
| 7,489,777 B2 | 2/2009 | Yamazaki et al. |
| 7,489,829 B2 | 2/2009 | Sorek et al. |
| 7,508,384 B2 | 3/2009 | Zhang et al. |
| 7,518,493 B2 | 4/2009 | Bryzek et al. |
| 7,522,947 B2 | 4/2009 | Tsuda |
| 7,526,402 B2 | 4/2009 | Tanenhaus et al. |
| 7,533,569 B2 | 5/2009 | Sheynblat |
| 7,541,214 B2 | 6/2009 | Wan |
| 7,549,335 B2 | 6/2009 | Inoue et al. |
| 7,552,636 B2 * | 6/2009 | Datskos ............ 73/504.04 |
| 7,557,832 B2 | 7/2009 | Lindenstruth et al. |
| 7,558,013 B2 | 7/2009 | Jeansonne et al. |
| 7,562,573 B2 | 7/2009 | Yazdi |
| 7,593,627 B2 | 9/2009 | Wernersson |
| 7,609,320 B2 | 10/2009 | Okamura |
| 7,617,728 B2 | 11/2009 | Cardarelli |
| 7,621,183 B2 | 11/2009 | Seeger et al. |
| 7,637,155 B2 | 12/2009 | Delevoye |
| 7,642,741 B2 | 1/2010 | Sidman |
| 7,650,787 B2 | 1/2010 | Ino |
| 7,656,428 B2 | 2/2010 | Trutna, Jr. |
| 7,667,686 B2 | 2/2010 | Suh |
| 7,672,781 B2 | 3/2010 | Churchill et al. |
| 7,677,099 B2 | 3/2010 | Nasiri et al. |
| 7,677,100 B2 | 3/2010 | Konaka |
| 7,683,775 B2 | 3/2010 | Levinson |
| 7,688,306 B2 | 3/2010 | Wehrenberg et al. |
| 7,689,378 B2 | 3/2010 | Kolen |
| 7,732,302 B2 | 6/2010 | Yazdi |
| 7,735,025 B2 | 6/2010 | Lee et al. |
| 7,737,965 B2 | 6/2010 | Alter et al. |
| 7,765,869 B2 | 8/2010 | Sung et al. |
| 7,769,542 B2 | 8/2010 | Calvarese et al. |
| 7,779,689 B2 * | 8/2010 | Li et al. ............ 73/510 |
| 7,781,666 B2 | 8/2010 | Nishitani et al. |
| 7,782,298 B2 | 8/2010 | Smith et al. |
| 7,783,392 B2 | 8/2010 | Oikawa |
| 7,784,344 B2 | 8/2010 | Pavelescu et al. |
| 7,796,872 B2 | 9/2010 | Sachs et al. |
| 7,805,245 B2 | 9/2010 | Bacon et al. |
| 7,813,892 B2 | 10/2010 | Sugawara et al. |
| 7,814,791 B2 | 10/2010 | Andersson et al. |
| 7,814,792 B2 * | 10/2010 | Tateyama et al. .......... 73/504.12 |
| 7,843,502 B2 | 11/2010 | Jeng et al. |
| 7,886,597 B2 * | 2/2011 | Uchiyama et al. ......... 73/504.12 |
| 7,907,037 B2 | 3/2011 | Yazdi |
| 7,907,838 B2 * | 3/2011 | Nasiri et al. .................... 396/55 |
| 7,924,267 B2 | 4/2011 | Sirtori |
| 7,932,925 B2 | 4/2011 | Inbar et al. |
| 7,970,586 B1 | 6/2011 | Kahn et al. |
| 7,995,852 B2 | 8/2011 | Nakamaru |
| 8,018,435 B2 | 9/2011 | Orchard et al. |
| 8,020,441 B2 | 9/2011 | Seeger |
| 8,022,995 B2 | 9/2011 | Yamazaki et al. |
| 8,035,176 B2 | 10/2011 | Jung et al. |
| 8,047,075 B2 | 11/2011 | Nasiri et al. |
| 8,099,124 B2 | 1/2012 | Tilley |
| 8,113,050 B2 | 2/2012 | Acar et al. |
| 8,139,026 B2 | 3/2012 | Griffin |
| 8,141,424 B2 | 3/2012 | Seeger et al. |
| 8,160,640 B2 | 4/2012 | Rofougaran et al. |
| 8,204,684 B2 | 6/2012 | Forstall et al. |
| 8,230,740 B2 | 7/2012 | Katsuki et al. |
| 8,239,162 B2 | 8/2012 | Tanenhaus |
| 8,250,921 B2 * | 8/2012 | Nasiri et al. .................... 73/511 |
| 8,322,213 B2 | 12/2012 | Trusov et al. |
| 8,351,773 B2 * | 1/2013 | Nasiri et al. .................... 396/55 |
| 8,427,426 B2 | 4/2013 | Corson et al. |
| 2001/0045127 A1 | 11/2001 | Chida et al. |
| 2002/0027296 A1 | 3/2002 | Badehi |
| 2002/0189351 A1 | 12/2002 | Reeds et al. |
| 2003/0159511 A1 | 8/2003 | Zarabadi et al. |
| 2003/0209789 A1 | 11/2003 | Hanson et al. |
| 2004/0016995 A1 | 1/2004 | Kuo et al. |
| 2004/0034449 A1 | 2/2004 | Yokono et al. |
| 2004/0066981 A1 | 4/2004 | Li et al. |
| 2004/0125073 A1 | 7/2004 | Potter et al. |
| 2004/0160525 A1 | 8/2004 | Kingetsu et al. |
| 2004/0179108 A1 | 9/2004 | Sorek et al. |
| 2004/0200279 A1 | 10/2004 | Mitani et al. |
| 2004/0227201 A1 | 11/2004 | Borwick, III et al. |
| 2004/0260346 A1 | 12/2004 | Overall et al. |
| 2005/0023656 A1 | 2/2005 | Leedy |
| 2005/0066728 A1 | 3/2005 | Chojnacki et al. |
| 2005/0110778 A1 | 5/2005 | Ayed |
| 2005/0170656 A1 | 8/2005 | Nasiri et al. |
| 2005/0212751 A1 | 9/2005 | Marvit et al. |
| 2005/0212760 A1 | 9/2005 | Marvit et al. |
| 2005/0239399 A1 | 10/2005 | Karabinis |
| 2005/0262941 A1 | 12/2005 | Park et al. |
| 2006/0017837 A1 | 1/2006 | Sorek et al. |
| 2006/0032308 A1 | 2/2006 | Acar et al. |
| 2006/0033823 A1 | 2/2006 | Okamura |
| 2006/0061545 A1 | 3/2006 | Hughes et al. |
| 2006/0074558 A1 | 4/2006 | Williamson et al. |
| 2006/0115297 A1 | 6/2006 | Nakamaru |
| 2006/0119710 A1 | 6/2006 | Ben-Ezra et al. |
| 2006/0139327 A1 | 6/2006 | Dawson et al. |
| 2006/0164382 A1 | 7/2006 | Kulas et al. |
| 2006/0164385 A1 | 7/2006 | Smith et al. |
| 2006/0184336 A1 | 8/2006 | Kolen |
| 2006/0185502 A1 | 8/2006 | Nishitani et al. |
| 2006/0187308 A1 | 8/2006 | Lim et al. |
| 2006/0197753 A1 | 9/2006 | Hotelling |
| 2006/0208326 A1 | 9/2006 | Nasiri et al. |
| 2006/0219008 A1 | 10/2006 | Tanaka et al. |
| 2006/0236761 A1 | 10/2006 | Inoue et al. |

(56) References Cited

U.S. PATENT DOCUMENTS

| | | |
|---|---|---|
| 2006/0251410 A1 | 11/2006 | Trutna, Jr. |
| 2006/0256074 A1 | 11/2006 | Krum et al. |
| 2006/0274032 A1 | 12/2006 | Mao et al. |
| 2006/0287084 A1 | 12/2006 | Mao et al. |
| 2006/0287085 A1 | 12/2006 | Mao et al. |
| 2007/0006472 A1 | 1/2007 | Bauch |
| 2007/0029629 A1 | 2/2007 | Yazdi |
| 2007/0035630 A1 | 2/2007 | Lindenstruth et al. |
| 2007/0036348 A1 | 2/2007 | Orr |
| 2007/0055468 A1 | 3/2007 | Pylvanainen |
| 2007/0063985 A1 | 3/2007 | Yamazaki et al. |
| 2007/0113207 A1 | 5/2007 | Gritton |
| 2007/0123282 A1* | 5/2007 | Levinson ............... 455/500 |
| 2007/0125852 A1 | 6/2007 | Rosenberg |
| 2007/0146325 A1 | 6/2007 | Poston et al. |
| 2007/0167199 A1 | 7/2007 | Kang |
| 2007/0176898 A1 | 8/2007 | Suh |
| 2007/0219744 A1 | 9/2007 | Kolen |
| 2007/0239399 A1 | 10/2007 | Sheynblat et al. |
| 2007/0273463 A1 | 11/2007 | Yazdi |
| 2007/0277112 A1 | 11/2007 | Rossler et al. |
| 2007/0296571 A1 | 12/2007 | Kolen |
| 2008/0001770 A1 | 1/2008 | Ito et al. |
| 2008/0009348 A1 | 1/2008 | Zalewski et al. |
| 2008/0088602 A1 | 4/2008 | Hotelling |
| 2008/0098315 A1 | 4/2008 | Chou et al. |
| 2008/0134784 A1 | 6/2008 | Jeng et al. |
| 2008/0158154 A1 | 7/2008 | Liberty et al. |
| 2008/0204566 A1 | 8/2008 | Yamazaki et al. |
| 2008/0303697 A1 | 12/2008 | Yamamoto |
| 2008/0314147 A1 | 12/2008 | Nasiri et al. |
| 2008/0319666 A1 | 12/2008 | Petrov et al. |
| 2009/0005975 A1 | 1/2009 | Forstall et al. |
| 2009/0005986 A1 | 1/2009 | Soehren |
| 2009/0007661 A1 | 1/2009 | Nasiri et al. |
| 2009/0043504 A1 | 2/2009 | Bandyopadhyay et al. |
| 2009/0088204 A1 | 4/2009 | Culbert et al. |
| 2009/0128485 A1 | 5/2009 | Wu |
| 2009/0282917 A1 | 11/2009 | Acar |
| 2009/0326851 A1 | 12/2009 | Tanenhaus |
| 2010/0013814 A1 | 1/2010 | Jarczyk |
| 2010/0033422 A1 | 2/2010 | Mucignat et al. |
| 2011/0101474 A1 | 5/2011 | Funk |
| 2012/0154633 A1 | 6/2012 | Rodriguez |

FOREIGN PATENT DOCUMENTS

| | | |
|---|---|---|
| CN | 101178615 A | 5/2008 |
| CN | 101203821 A | 6/2008 |
| EP | 0429391 | 8/1995 |
| GB | 2428802 | 2/2007 |
| JP | 06-291725 | 10/1994 |
| JP | 10-240434 | 9/1998 |
| JP | 2000-148351 | 5/2000 |
| JP | 2001-174283 | 6/2001 |
| JP | 2001-272413 | 10/2001 |
| JP | 2004-517306 | 6/2004 |
| JP | 2004-258837 | 9/2004 |
| JP | 2005-233701 | 9/2005 |
| JP | 2005-283428 | 10/2005 |
| JP | 2005-345473 | 12/2005 |
| JP | 2006-146440 | 6/2006 |
| JP | 2006-275660 | 10/2006 |
| JP | 2007-041143 | 2/2007 |
| JP | 2007-173641 | 7/2007 |
| JP | 2008-003182 | 1/2008 |
| JP | 2008091523 | 4/2008 |
| JP | 2008-520985 | 6/2008 |
| WO | 0151890 | 7/2001 |
| WO | 2005103863 | 11/2005 |
| WO | 2005109847 | 11/2005 |
| WO | 2006000639 | 1/2006 |
| WO | 2006043890 | 4/2006 |
| WO | W02006043890 | 4/2006 |
| WO | WO 2006/046098 | 5/2006 |
| WO | 2007147012 | 12/2007 |
| WO | WO 2008/026357 | 3/2008 |
| WO | 2008068542 | 6/2008 |
| WO | 2009016607 | 2/2009 |
| WO | WO2009016607 | 2/2009 |

OTHER PUBLICATIONS

Singh, Amit, "The Apple Motion Sensor as a Human Interface Device," www.kernelthread.com, 1994-2006.

Cho, et al., Dynamics of Tilt-based Browsing on Mobile Devices. CHI 2007, Apr. 28-May 3, 2007, San Jose, California, USA., pp. 1947-1952.

Liu Jun, et al., "Study on Single Chip Integration Accelerometer Gyroscope," Journal of Test and Measurement Technology, vol. 17, Issue 2, pp. 157-158, Dec. 31, 2003.

Civil Action No. 2:13-cv-405-JRG "Invalidity Contentions", Oct. 31, 2013.

Civil Action No. 2:13-cv-405-JRG, Exhibit A, Invalidity Charts for U.S. Patent No. 8,347,717, Oct. 31, 2013.

Civil Action No. 2:13-cv-405-JRG, Exhibit C, Motivation to Combine References, Oct. 31, 2013.

Civil Action No. 2:13-cv-405-JRG, Exhibit B, Table of References, Oct. 31, 2013.

Civil Action No. 2:13-cv-405-JRG, Exhibit D, Invalidity Charts for U.S. Patent No. 8,351,773, Oct. 31, 2013.

Civil Action No. 2:13-cv-405-JRG, Exhibit F, Motivation to Combine References, Oct. 31, 2013.

Civil Action No. 2:13-cv-405-JRG, Exhibit E, Table of References, Oct. 31, 2013.

Civil Action No. 2:13-cv-405-JRG, Exhibit G, Invalidity Charts for U.S. Patent No. 8,250,921, Oct. 31, 2013.

Civil Action No. 2:13-cv-405-JRG, Exhibit I, Motivation to Combine References, Oct. 31, 2013.

Civil Action No. 2:13-cv-405-JRG, Exhibit H, Table of References, Oct. 31, 2013.

Jones, A. et al., "Micromechanical Systems Opportunities," 1995, Department of Defense.

Brandl, M. And Kempe, V., "High Performance Accelerometer Based on CMOS Technologies with Low Cost Add-Ons," 2001, IEEE.

Goldstein, H., "Packages Go Vertical," 2001, IEEE/CPMT International Electronics Manufacturing Technology Symposium.

Cardarelli, D., "An Integrated MEMS Inertial Measurement Unit," 2002, IEEE.

Hatsumei, "The Invention," 2003.

Brandl, M., et al., "A Modular MEMS Accelerometer Concept," 2003, AustriaMicroSystems.

Bryzek, J., "MEMS-IC integration remains a challenge," Oct. 29, 2003, EE Times.

Gluck, N. and Last, R., "Military and Potential Homeland Security Applications for Microelectromechanical Systems (MEMS)," Nov. 2004, Institute for Defense Analysis.

Rhee, T., et al., "Development of Character Input System using 3-D Smart Input Device," 2005.

Cho, N., "MEMS accelerometer IOD report," Jan. 31, 2005.

"MST News: Assembly & Packaging," Feb. 2005, VDI/VDE—Innovation + Technick GmbH.

Leondes, C.T., "MEMS/NEMS Handbook Techniques and Applications," 2006, Springer Science+Business Media, Inc.

Higurashi, E., et al., "Integration and Packaging Technologies for Small Biomedical Sensors," 2007.

Jang, S., et al., "MEMS Type Gyro Chip," IT Soc Magazine.

Foxlin, E., et al., "Small type 6-axis tracking system for head mounted display".

Extended European Search Report issued Mar. 25, 2014 for Application No. 08797283.2.

* cited by examiner

INTEGRATED MOTION PROCESSING UNIT (MPU) WITH MEMS INERTIAL SENSING AND EMBEDDED DIGITAL ELECTRONICS

CROSS-REFERENCE TO RELATED APPLICATION

Under 35 U.S.C. §120 the present application is a continuation of U.S. patent application Ser. No. 11/774,488, filed Jul. 6, 2007, entitled "INTEGRATED MOTION PROCESSING UNIT (MPU) WITH MEMS INERTIAL SENSING AND EMBEDDED DIGITAL ELECTRONICS," which is incorporated herein by reference.

FIELD OF THE INVENTION

The present invention relates to microelectromechanical systems (MEMS) devices.

BACKGROUND OF THE INVENTION

Microelectromechanical systems (MEMS) technology has been under steady development for some time, and as a result various MEMS devices (e.g., accelerometers for measuring linear acceleration and gyroscopes for measuring angular velocity) have been implemented within several applications. For example, individual accelerometer and gyroscope sensors are currently being used in vehicle air bag controls, gaming consoles, digital cameras, video cameras, and mobile phones.

MEMS devices typically generate one or more analog output signals that correspond to a given measurement and, therefore, an analog-to-digital converter (ADC) is usually required to convert the analog output signals into corresponding digital signals for digital signal processing. Conventional applications that include a MEMS device and an analog-to-digital converter (ADC), typically implement multi-chip board level technology to couple the MEMS device to the analog-to-digital converter (ADC), and/or implement the MEMS device and the analog-to-digital converter (ADC) on separate chips, printed circuit boards (PCBs), or modules. Such usage of board level assembly technology to couple a MEMS device to an analog-to-digital converter (ADC), and implementation of a MEMS device on a separate chip or printed circuit board, however, requires lots of space, more power, and higher cost, which generally limits the number of applications into which MEMS devices can be utilized.

BRIEF SUMMARY OF THE INVENTION

In general, in one aspect, this specification describes a module operable to be mounted onto a surface of a board. The module includes a linear accelerometer to provide a first measurement output corresponding to a measurement of linear acceleration in at least one axis, and a first rotation sensor operable to provide a second measurement output corresponding to a measurement of rotation about at least one axis. The accelerometer and the first rotation sensor are formed on a first substrate. The module further includes an application specific integrated circuit (ASIC) to receive both the first measurement output from the linear accelerometer and the second measurement output from the first rotation sensor. The application specific integrated circuit (ASIC) includes an analog-to-digital converter (ADC) and is implemented on a second substrate. The first substrate is vertically bonded to the second substrate. Implementations can provide one or more of the following advantages. A surface mountable module is provided that includes a gyroscope (or other device as described below) and an analog-to-digital converter (ADC). In one implementation, the gyroscope (which is implemented on a MEMS substrate) is bonded to a CMOS integrated circuit substrate (including the analog-to-digital converter (ADC)) through wafer bonding. Such an implementation provides valuable savings in terms of area, performance, and cost. Such a module can be implemented in applications such as cellular phones, personal digital assistants (PDAs), digital cameras, or other hand-held devices to provide, e.g., image stabilization. The module provides a system level solution with the ability to integrate additional functions onto a chip. In one implementation, a motion processing unit is disclosed that provides six axes of sensing (e.g., 3 axes acceleration and 3 axes angular velocity). The motion processing unit includes embedded processing and all the related features that can enable motion sensing application in multitude of consumer and non-consumer applications. In addition, the specification discloses a motion processing unit that integrates sensors (that provide for, e.g., 6-axes of sensing) along with associated smart electronics packaged at a wafer level. Such a motion processing unit provides a low cost, small package, and high performance solution for the consumer applications.

The details of one or more implementations are set forth in the accompanying drawings and the description below. Other features and advantages will be apparent from the description and drawings.

BRIEF DESCRIPTION OF THE DRAWINGS

Like reference symbols in the various drawings indicate like elements.

DETAILED DESCRIPTION OF THE INVENTION

The present invention relates generally to microelectromechanical systems (MEMS) devices. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
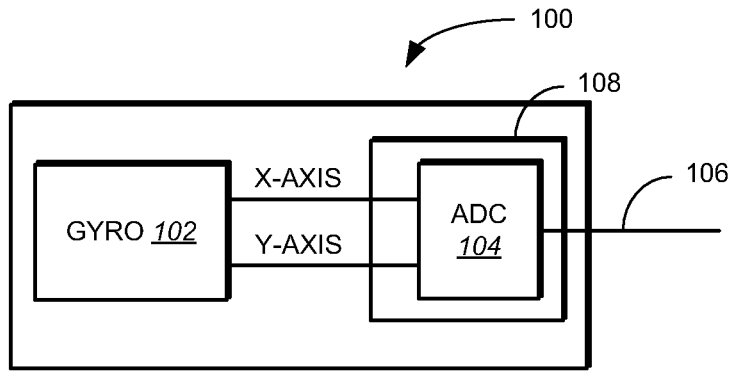
FIG. 1 is a block diagram of a module including a gyroscope and an analog-to-digital converter (ADC) according to one implementation.

FIG. 1 illustrates a module 100 including MEMS sensing device (e.g., a gyroscope 102) and an analog-to-digital converter (ADC) 104 in accordance with one implementation. In one implementation, the module 100 is a single chip (or package) that can be mounted onto a surface of a printed circuit board (PCB). In one implementation, the analog-to-digital converter (ADC) 104 is a component of an application specific integrated circuit (ASIC) 108. As shown in FIG. 1, the gyroscope 102 provides two analog output signals corresponding to a measured angular velocity in the X-axis and the Y-axis. More generally, the gyroscope 102 is at least a two-axis microelectromechanical systems (MEMs) gyroscope. In one implementation, the gyroscope 102 is a gyroscope as described in commonly owned U.S. Pat. No. 6,892,575—entitled "X-Y Axis Dual-Mass Tuning Fork Gyroscope With Vertically Integrated Electronics and Wafer-Scale Hermetic Packaging", which is incorporated herein by reference. Accordingly, in one implementation, the gyroscope 102 is implemented on a MEMS substrate, which MEMS substrate is bonded to a CMOS integrated circuit substrate (including the ASIC 108 and analog-to-digital converter (ADC) 104) through wafer bonding. In one implementation, the MEMS substrate is bonded to the CMOS integrated circuit substrate through wafer bonding techniques that use vertical fabrication processes as described in commonly owned U.S. Pat. No. 7,104,129—"Vertically Integrated MEMS Structure with Electronics in a Hermetically Sealed Cavity", which is incorporated herein by reference. Although the module 100 is shown as including a gyroscope, the module 100 can instead include a multiple-axis (linear) accelerometer (e.g., a 3-axis accelerometer) as described in commonly owned U.S. patent application Ser. No. 11/285,493, entitled—"Multiple Axis Accelerometer", which is incorporated herein by reference. More generally, the module can further include other types of MEMS sensing devices—e.g., a second rotation sensor, such as a rate sensor (or gyroscope) and/or a rotational acceleration sensor.

In operation, the analog-to-digital converter (ADC) 104 converts the analog output signals of the gyroscope 102 into corresponding digital signals that can be output from the analog-to-digital converter (ADC) 104 through output 106. In one implementation, the module 100 includes a multiplexer (not shown) for selectively providing one of the analog output signals of the gyroscope 102 to the analog-to-digital converter (ADC) 104. The multiplexer can be a component of the application specific circuit (ASIC) 108.

Figure 2:
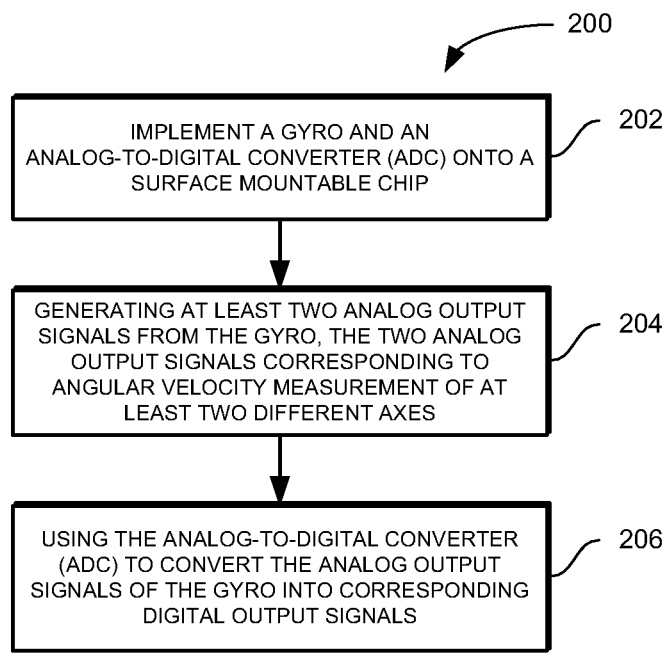
FIG. 2 illustrates a method for implementing and utilizing a gyroscope and an analog-to-digital converter (ADC) according to one implementation.

FIG. 2 illustrates a method 200 for implementing and utilizing a gyroscope and an analog-to-digital converter (ADC) according to one implementation. A gyroscope (e.g., gyroscope 102) and an analog-to-digital converter (ADC) (e.g., analog-to-digital converter (ADC) 104) are implemented onto a surface mountable chip (e.g., module 100) (step 202). In one implementation, the gyroscope is fabricated onto the chip including the analog-to-digital converter (ADC) using vertical fabrication processes. At least two analog output signals are generated by the gyroscope, in which the two analog output signals correspond to angular velocity measurement of at least two different axes (step 204). In operation, the analog-to-digital converter (ADC) converts the analog output signals of the gyroscope into corresponding digital signals (step 206).

Figure 3:
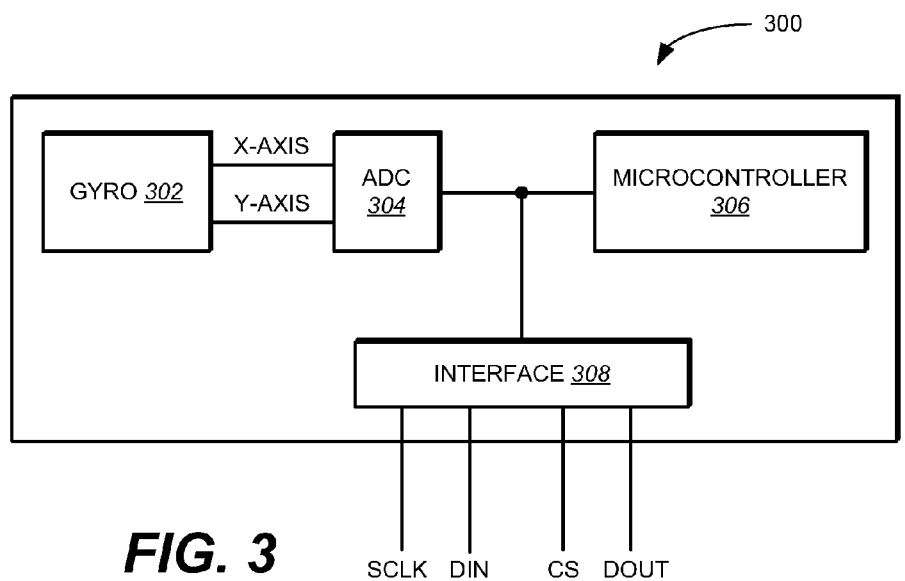
FIG. 3 is a block diagram of a module including a gyroscope, an analog-to-digital converter (ADC), and a microcontroller according to one implementation.

FIG. 3 is a block diagram of a module 300 in accordance with one implementation. The module 300 includes a gyroscope 302, an analog-to-digital converter (ADC) 304, a microcontroller 306, and an interface 308. In one implementation, the module 300 is a single chip that can be mounted onto a surface of a printed circuit board (PCB). In one implementation, the gyroscope 302 is bonded to the chip using vertical fabrication processes. Accordingly, in this implementation, the gyroscope 302, the analog-to-digital converter (ADC) 304, the microcontroller 306, and the interface 308 can be implemented onto a same substrate—e.g., a CMOS substrate. In one implementation, the module 300 further includes a multiplexer (not shown) for selectively providing one of the analog output signals of the gyroscope 302 to the analog-to-digital converter (ADC) 304. In one implementation, the analog-to-digital converter (ADC) 304, the microcontroller 306, the interface 308, and the multiplexer are components of an application specific circuit (ASIC).

Figure 4:
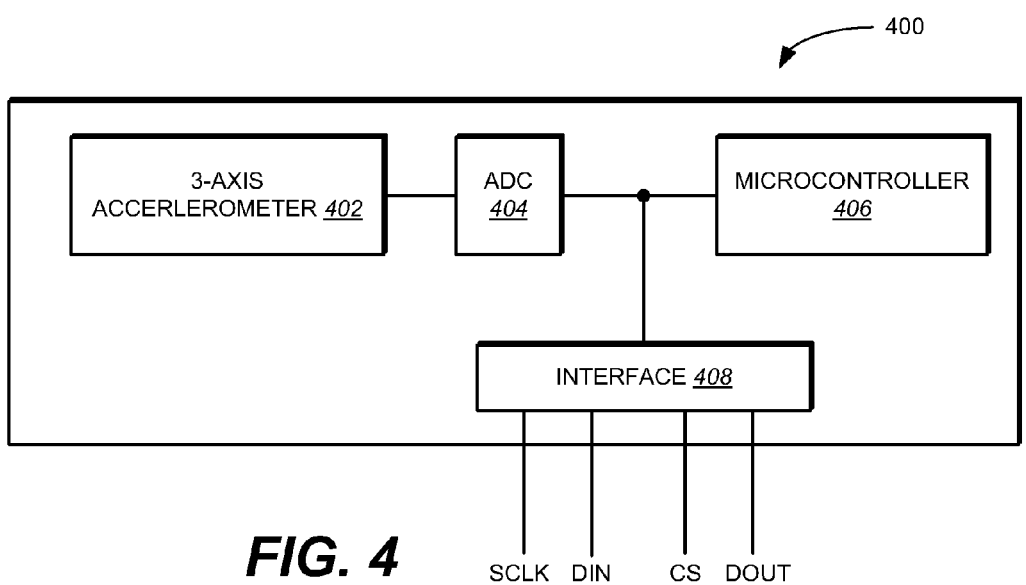
FIG. 4 is a block diagram of a module including a 3-axis accelerometer, an analog-to-digital converter (ADC), and a microcontroller according to one implementation.

In one implementation, the gyroscope 302 generates two analog output signals respectively corresponding to a measured angular velocity in the X-axis and the Y-axis. The analog output signals are converted into corresponding digital signals by the analog-to-digital converter (ADC) 304. The microcontroller 306 processes the digital signals. The interface 308 provides an interface to the microcontroller 306. The interface 308 can be a serial peripheral interface (SPI), an inter integrated circuit (I2C) interface, or other suitable interface. In the implementation shown in FIG. 3, the interface 308 is an SPI interface having two control lines (SCLK and CS), and two data lines (DIN and DOUT). In general, the module 300 can include other types of MEMS sensors other than a gyroscope. For example, FIG. 4 illustrates a module 400 including a 3-axis accelerometer that sends an analog output to an analog-to-digital converter (ADC) 404. The analog-to-digital converter (ADC) 404 converts the analog output signal into a corresponding digital signal for processing by a microcontroller 406. Similar to the module 300, the module 400 further includes an interface 408 (e.g., a serial peripheral interface (SPI)) that is coupled to the microcontroller 406.

Figure 5:
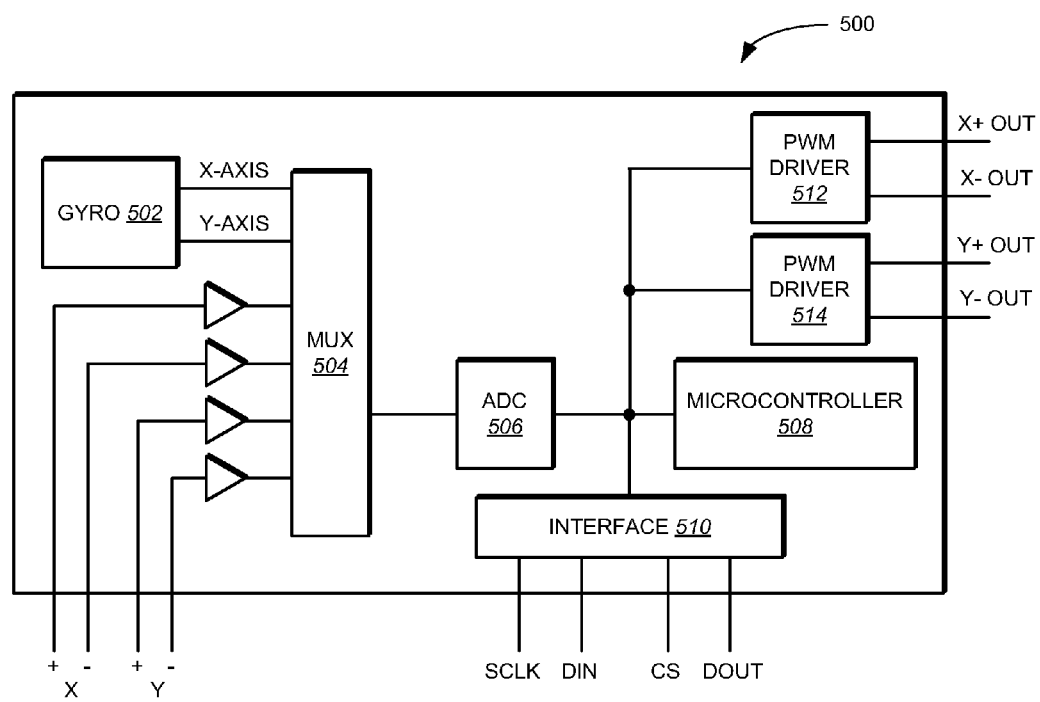
FIG. 5 is a block diagram of a module including a gyroscope, an analog-to-digital converter (ADC), and a microcontroller that can be utilized within an image stabilization application.

FIG. 5 illustrates a block diagram of a module 500 in accordance with one implementation. In one implementation, the module 500 includes a gyroscope 502, a multiplexer (MUX) 504, a (e.g., 16 bit) analog-to-digital converter (ADC) 506, a microcontroller 508, an interface 510, and pulse width modulator drivers 512, 514. In one implementation, the module 500 is a single chip that can be mounted onto a surface of a printed circuit board (PCB). In one implementation, the gyroscope 502 is bonded to the chip using vertical fabrication processes. Accordingly, in this implementation, the gyroscope 502, the multiplexer (MUX) 504, the analog-to-digital converter (ADC) 506, the microcontroller 508, the interface 510, and the pulse width modulator drivers 512, 514 are fabricated onto a same substrate. In another implementation, the gyroscope 502 is implemented on a chip that is separate from the module 500. In this implementation, the gyroscope 502 and the module 500 can be fabricated onto a board that can be mounted onto a surface of a printed circuit board (PCB). The module 500 provides a system level solution for the integration of multiple functions onto a chip, including controller functions. The module 500 provides an efficient partitioning between analog functions and digital functions. In one implementation, the module 500 further includes a memory (not shown) that is in communication with the microcontroller 508. The memory can store program instructions and/or data related to functions (e.g., image stabilization calculations, as discussed below) that can be performed by the microcontroller 508.

In one implementation, the module 500 is implemented within an image stabilization application. For example, the module 500 can be implemented within, e.g., binoculars, telephoto lenses, or digital cameras, to achieve optical image stabilization for these devices. In such an implementation, the gyroscope 502 detects movement of, e.g., a lens, and generates corresponding analog output signals corresponding to the movement of the lens. The MUX 504 is operable to selectively provide an (analog) measurement output signal from the gyroscope 502 (or one or more (analog) measurement outputs from one or more corresponding second measurement devices (not shown)) to the analog-to-digital converter 506. The microcontroller 508 performs one or more optical image stabilization calculations based on a digital signal received from the analog-to-digital converter (ADC) 506, and generates control signals that are sent to pulse width modulator drivers 512, 514 for driving one or more actuators (not shown) to counteract the movement of the lens and maintain a stable picture. Types of measurement devices that can be coupled to the MUX 404 (in addition to the gyroscope 502) include a second (MEMs) gyroscope, an accelerometer, a position sensor, a pressure sensor, a temperature sensor, or other sensor or device.

Figure 6:
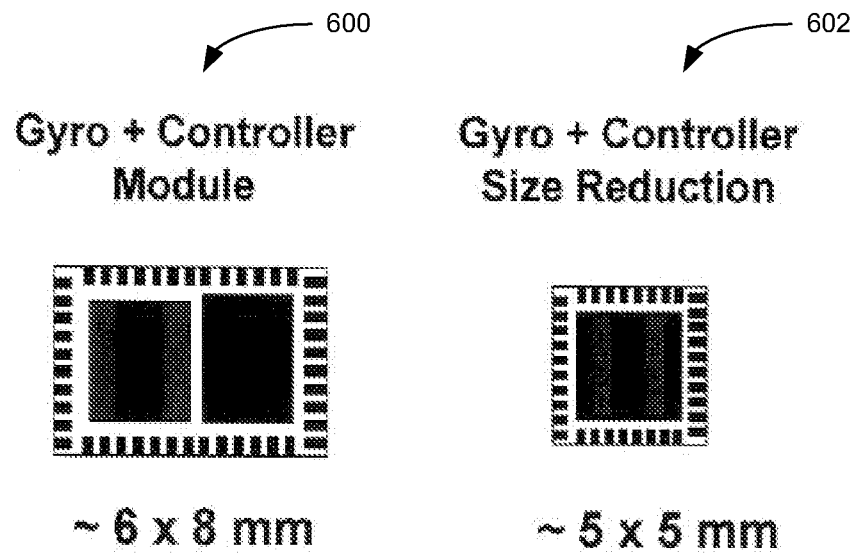
FIG. 6 illustrates two footprints of the module of FIG. 5 in accordance with two different implementations.

FIG. 6 illustrates a footprint 600 of a gyroscope and a microcontroller implemented on separate chips and a footprint 602 of a gyroscope and a microcontroller implemented on the same chip. As shown in FIG. 6, the footprint 600 (of a gyroscope and a microcontroller implemented on separate chips) has a size of substantially 6 mm×8 mm, and the footprint 602 (of a gyroscope and a microcontroller implemented on the same chip) has a size of substantially 5 mm×5 mm. Such small footprints enables the system level solution (e.g., integration of gyroscope and controller) provided by the modules discussed above to be implemented in applications (such as in hand held device applications) in which size and power consumption of components are a critical factor.

Figure 7:
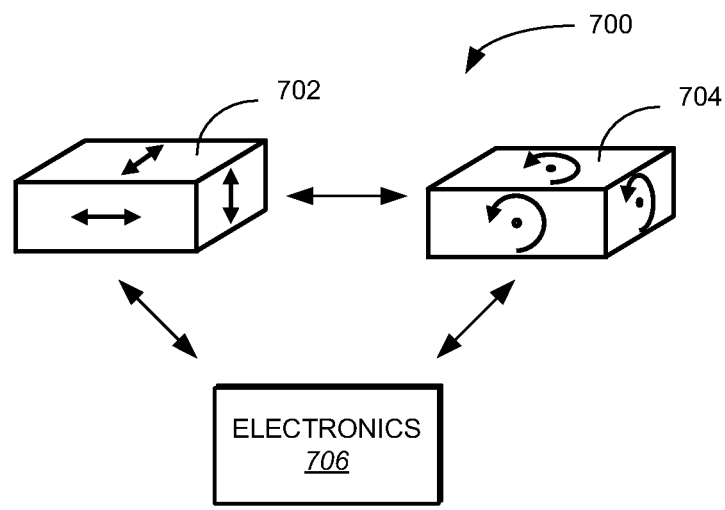
FIG. 7 illustrates a motion processing unit (MPU) according to one implementation.

FIG. 7 illustrates one implementation of components 700 that can be implemented on a module to form, e.g., a motion processing unit (MPU™), available from Invensense, Inc. of Santa Clara, Calif. In one implementation, a motion processing unit (MPU) is a device that can measure at least two axes of rotation and at least one axis of acceleration, in which components of the device are integrated in a single package, e.g., through wafer-scale integration. Wafer-scale integration includes building very-large integrated circuit networks that use an entire silicon wafer to produce a single "super-chip"—and in the context of this specification, (in one implementation) a single chip is provided that includes a motion processing unit (MPU) operable to measure both rotation and acceleration. In one implementation, the chip occupies a smaller area of silicon relative to conventional devices that may provide similar measurements.

Figure 8:
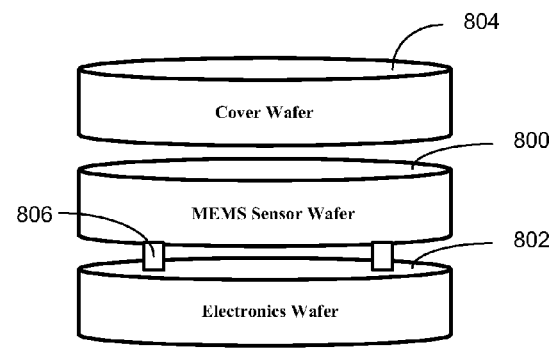
FIG. 8 illustrates a MEMS sensor wafer and an electronics wafer according to one implementation.

Referring to FIG. 7, in one implementation, the components 700 include a 3-axis accelerometer 702, a 3-axis gyroscope 704, and electronics 706 (e.g., CMOS electronics). The 3-axis accelerometer 702 and the 3-axis gyroscope 704 provide six axes of sensing (e.g., 3 axes acceleration and 3 axes angular velocity). In one implementation, the components 700 are respectively integrated onto a MEMS sensor wafer 800 and an electronics wafer 802, as shown in FIG. 8. More specifically, in one implementation, the 3-axis accelerometer 702 and the 3-axis gyroscope 704 are integrated onto the MEMS sensor wafer 800, and the electronics 706 is integrated onto the electronics wafer 802. In one implementation, the MEMS sensor wafer 800 is bonded to the electronics wafer 802. Any suitable bonding techniques can be used to bond the MEMS sensor wafer 800 to the electronics wafer 802, such as the bonding techniques described in commonly owned pending U.S. patent application Ser. No. 11/084,296, entitled "Method of Fabrication of AL/GE Bonding in a Wafer Packaging Environment and a Product Produced Therefrom", which is incorporated by reference herein. In one implementation, components integrated onto the MEMS sensor wafer 800 are electrically connected to components (e.g., CMOS electronics) associated with the electronics wafer 802 through electrical interconnects 806.

In one implementation, a cover wafer 804 (or cap wafer) is used to seal the MEMS sensor wafer 800 within a hermetic enclosure (in between the cover wafer 804 and the electronics wafer 802. In one implementation, (e.g., in order to meet some performance specifications of different markets for the motion processing unit), a reduced pressure (e.g., about 1 mTorr, which is substantially less than atmospheric pressure) can be provided within the hermetic enclosure.

Figure 9:
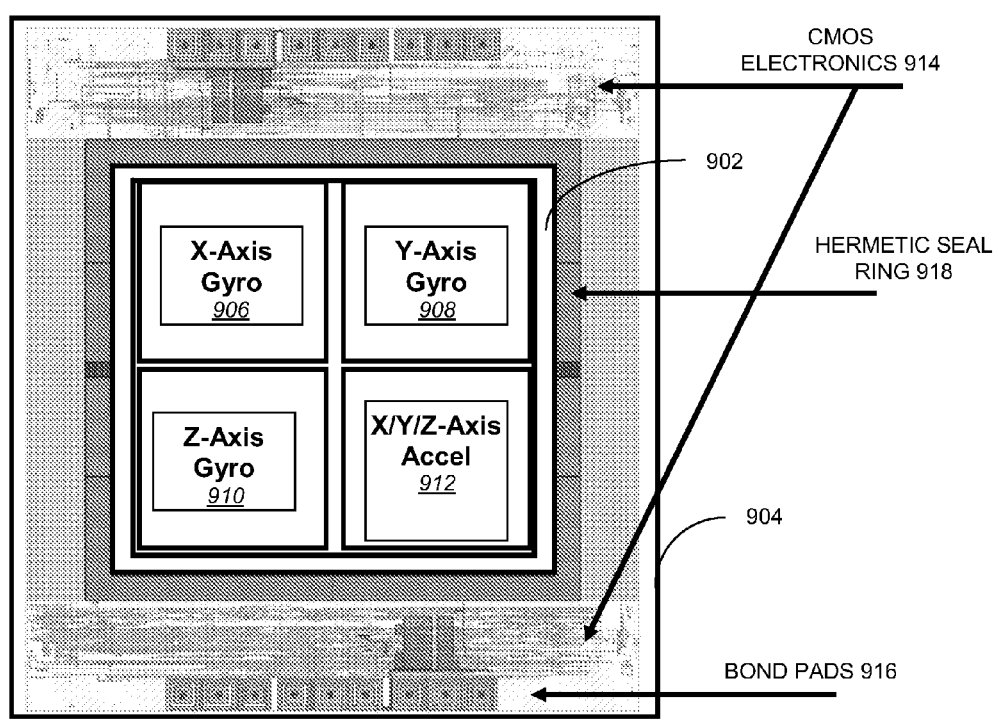
FIG. 9 illustrates a motion processing unit (MPU) according to one implementation.

FIG. 9 illustrates a motion processing unit 900 in accordance with one implementation. In the implementation of FIG. 9, the motion processing unit 900 comprises a package formed by a MEMS sensor wafer 902 bonded to an electronics wafer 904. In one implementation, the MEMS sensor wafer 902 includes an X-axis gyroscope 906, a Y-axis gyroscope 908, a Z-axis gyroscope 910, and an XYZ-axis accelerometer 912, and the electronics wafer 904 includes CMOS electronics 914 and bond pads 916. In general, the motion processing unit 900 can include other types of sensors, e.g., a temperature sensor (as discussed in greater detail below), or other type of sensor. The bond pads 916 can be used for integrating the package (comprising the motion processing unit 900) onto a printed circuit board (not shown) or other device. In one implementation, the MEMS sensor wafer 902 is bonded to the electronics wafer 904 with a hermetic seal ring 918.

Figure 10:
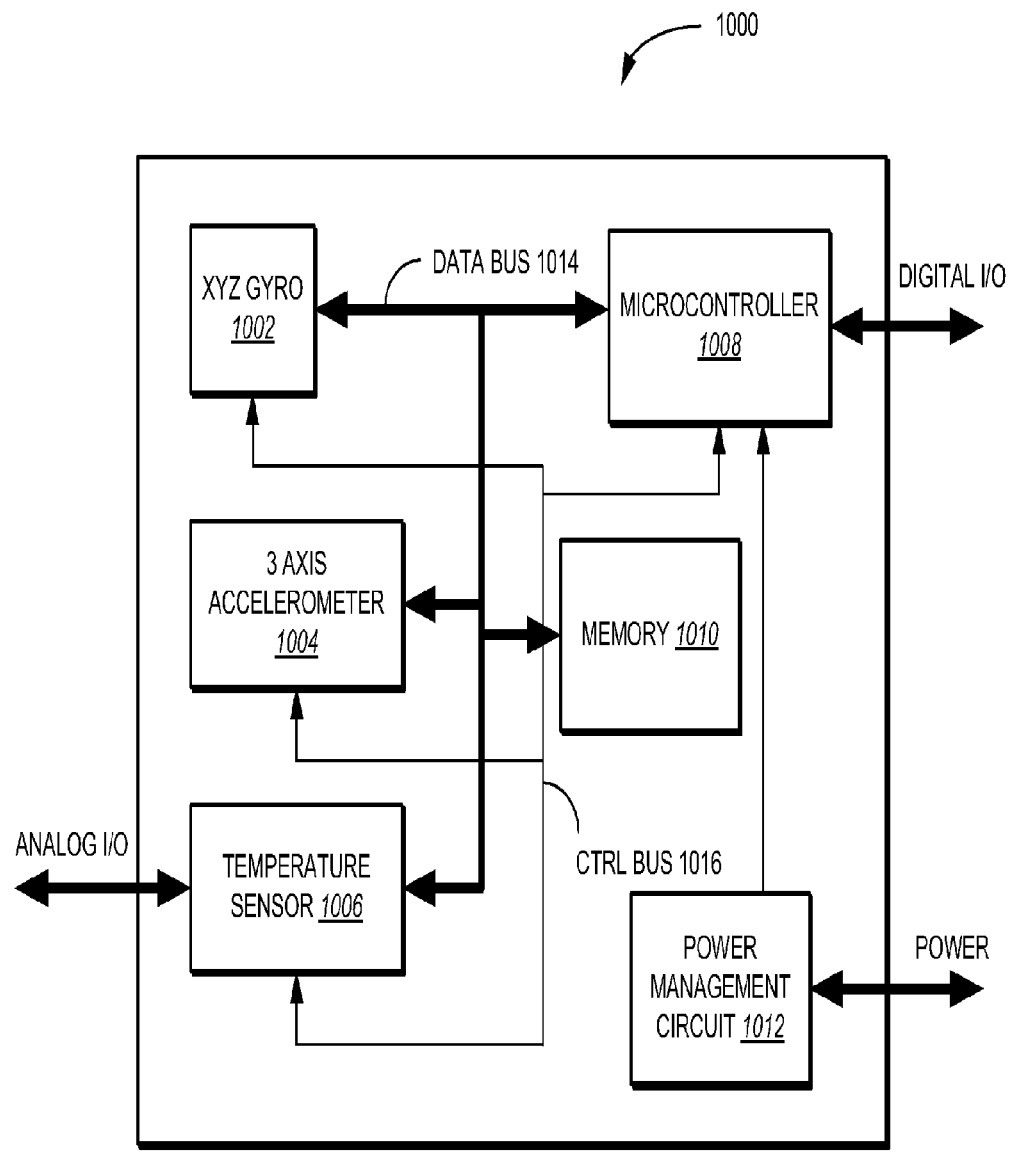
FIG. 10 illustrates a motion processing unit (MPU) according to one implementation.

FIG. 10 illustrates a block diagram of a motion processing unit 1000 in accordance with one implementation. The motion processing unit 1000 includes an XYZ gyroscope 1002, a 3-axis accelerometer 1004, a temperature sensor 1006, a microcontroller 1008, a memory 1010 (e.g., a random access memory (RAM)), and a power management circuit 1012. The components of the motion processing unit 1000 can be coupled together through a data bus 1014 and a control bus 1016. In one implementation, the power management circuit 1012 includes a voltage regulator and charge pump to power the microcontroller 1008. In one implementation, the power management circuit 1012 is capable of turning off any of the six sensors individually, or running each of the sensors at low power if higher noise is tolerable. The power management circuit 1012 may also respond to the sensors themselves, turning off the sensors (and the microcontroller 1008), for example, if no movement is detected for a pre-determined period. The motion processing unit 1000 further includes one or more analog-to-digital converters (ADCs) (not shown) for converting analog outputs of the XYZ gyroscope 1002, the 3-axis accelerometer 1004, and the temperature sensor 1006 into corresponding digital signals, which digital signals are then processed by the microcontroller 1008. In one implementation, the analog-to-digital converters provide 10 bits of resolution (or higher) ADC to permit a serialized data interface with an application processor.

As shown in FIG. 10, (in one implementation) the temperature sensor 1006 is coupled to one or more analog input/output (I/O) lines and the microcontroller 1008 is coupled to one or more digital I/O lines. In one implementation, the microcontroller 1008 can perform computations on the digital signals received from one or more of the XYZ gyroscope 1002, the 3-axis accelerometer 1004, or the temperature sensor 1006 as required by application requirements. In addition to containing the MEMS and temperature sensors, the motion processing unit 1000 may contain a programmable digital sampling system that combines an ADC and flexible filtering for meeting the various bandwidth, resolution, and power requirements for different applications. Further, the motion processing unit 1000 can include one or more user programmable registers (not shown) through which a user can set operating conditions including, for example, measuring limits, for each of the sensors and/or the microcontroller within the motion processing unit 1000.

Figure 11:
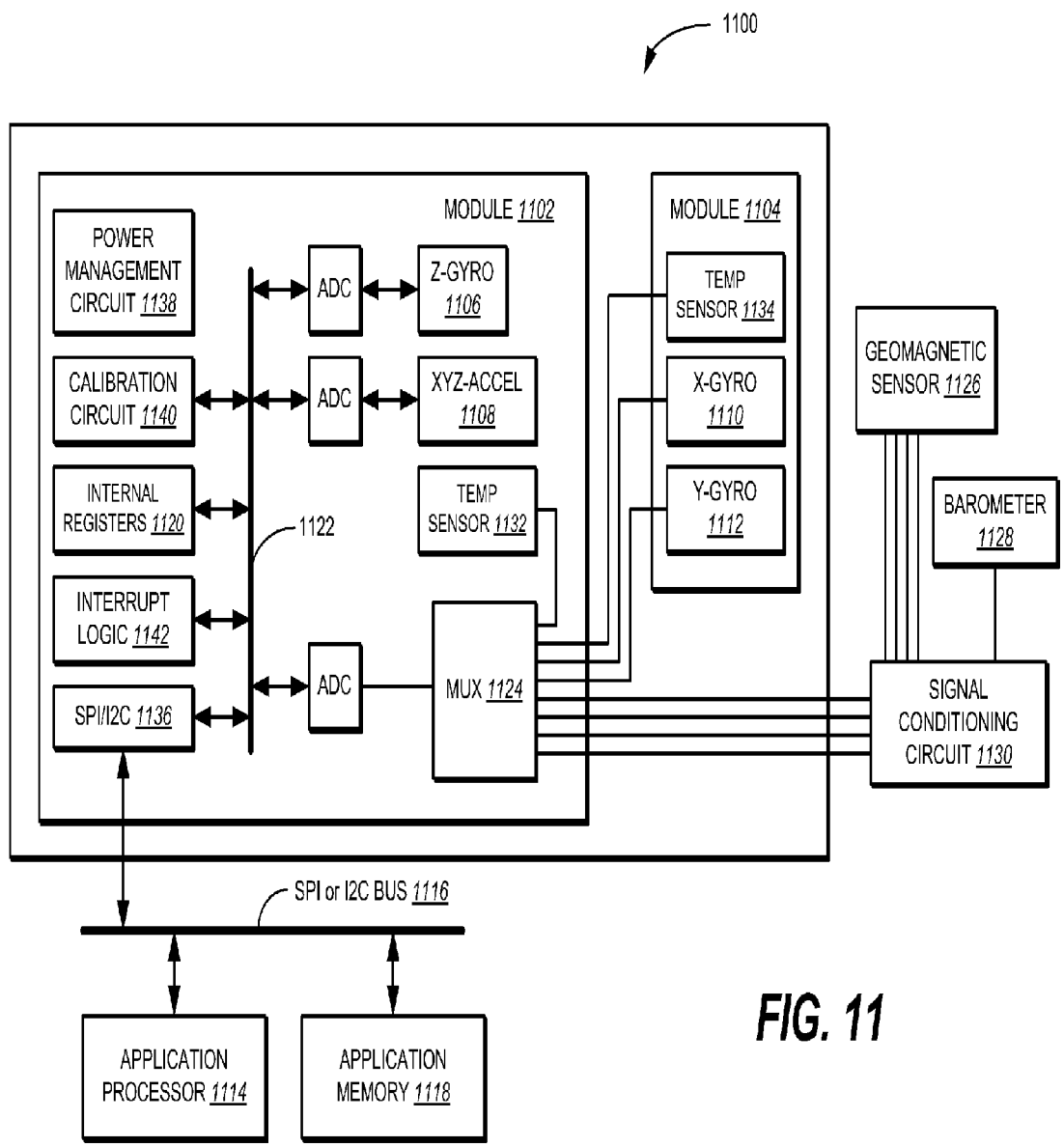
FIG. 11 illustrates a motion processing unit (MPU) according to one implementation.

FIG. 11 illustrates a block diagram of a motion processing unit 1100 in accordance with one implementation. The motion processing unit 1100 includes two modules—modules 1102, 1104—that each can be separably coupled to the motion processing unit 1100. In an implementation, in which both modules 1102, 1104 are coupled to the motion processing unit 1100, the motion processing unit 1100 can provide up to 6 axes of sensing. In particular, (in one implementation) the module 1102 provides a 4-axis measurement capability enabled by one Z-gyroscope 1106 and a 3-axis (XYZ) accelerometer 1108, and the module 1104 provides a 2-axis measurement capability through an X-gyroscope 1110 and a Y-gyroscope 1112. The Z-gyroscope 1106 detects the rotation about the Z-axis, and the 3-axis accelerometer 1108 detects linear acceleration along the X, Y and Z axes.

In one implementation, proof masses associated with the Z-gyroscope 1106 are electrostatically oscillated at resonance. An internal automatic gain control circuit (not shown) can precisely control the oscillation of the proof masses. When the Z-gyroscope 1106 is rotated about the Z-axis, the Coriolis causes a vibration that is detected by a capacitive pickoff. The resulting signal is amplified, demodulated, and filtered to produce an analog voltage that is proportional to the angular velocity. In one implementation, the 3-axis accelerometer 1108 consists of three independent linear accelerometers with separate proof masses. This minimizes any cross-axis coupling and reduces fabrication dependencies. A built in internal oscillator (not shown) can be used to capacitively read out any acceleration motion. In operation, acceleration induces displacement on a given proof mass. In one implementation, electrostatic sensors detect displacement of each proof mass differentially. This reduces the susceptibility to the fabrication variations as well as thermal drift.

In one implementation, the modules 1102, 1104 are implemented (e.g., vertically bonded) onto a same CMOS substrate—e.g., the MEMS wafers and CMOS electronic wafers can be bonded together using wafer-scale bonding processes as described in commonly owned U.S. Pat. No. 7,104,129 (incorporated by reference above) that simultaneously provides electrical connections and hermetically seals the MEMS devices. This unique and novel fabrication technique is the key enabling technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

As shown in FIG. 11, in one implementation, the motion processing unit 1100 interfaces with a microprocessor (or application processor 1114) through an SPI or I2C bus 1116. The motion processing unit 1100 can also be coupled to a memory (e.g., application memory 1118) through the SPI or I2C bus 1116. The I2C or SPI bus 1116 can be used to access internal registers (e.g., internal registers 1120) and sensor outputs. In one implementation, the module 1102 controls all the communication between sensor components. In one implementation, the module 1102 includes an internal memory (not shown) for registers to control the functions and to store trim values for the sensors. If additional memory is desired, it is possible to add an I2C compatible memory to a system bus 1122 within the module 1102.

In one implementation, the module 1102 has 7 analog inputs (that are received by a multiplexer (MUX) 1124) for interfacing auxiliary sensors. As shown in FIG. 11, three of the 7 analog inputs are used for interfacing with the module 1104 and the remaining analog inputs are used to interface with other sensors—e.g., a geomagnetic sensor 1126 (or compass) and a barometer 1128 (e.g., for altitude readings) through a signal conditioning circuit 1130. In one implementation, the voltage range for the analog inputs is +/−0.5V centered on 0.7V. The signal conditioning circuit 1130 adjusts the output voltage range of the geomagnetic sensor 1126 to voltage levels that can be handled by the multiplexer 1124.

In one implementation, each sensor (e.g., Z-gyroscope 1106 and XYZ accelerometer 1108) has a dedicated sigma-delta analog-to-digital converter (ADC) with 14-bit accuracy. In addition, there is also an additional analog-to-digital converter (ADC) coupled to the multiplexer 1124 for converting the auxiliary analog inputs and also an analog output from a temperature sensor 1132. In one implementation, the temperature sensor 1132 measures the temperature of the module 1102. The module 1104 can also include a temperature sensor (e.g., temperature sensor 1134) that measures a temperature of the module 1104. The temperature readings can be made available to a user through a SPI/I2C interface 1136. In one implementation, the range of voltage levels for the auxiliary inputs is 0.7+/−0.5V (or 0.2V to 1.2V). The ADC (coupled to the multiplexer 1124) can sample the selected analog input or the output of the temperature sensor 1132 depending on the configuration of the multiplexer 1124. The result can be stored in an appropriate register that is accessible via the SPI/I2C interface 1136. In one implementation, an internal clock is used to trigger ADC conversion. The clock rate or the output data rate can be selectable by a configuration register.

The module 1102 can further include a power management circuit 1138 that can control power to each of the sensors, and a calibration circuit 1140 for calibrating each of the sensors. In one implementation, the module 1102 also includes interrupt logic 1142 for generating interrupts. For example, an interrupt can be generated when a "zero-g" is detected on all axes of the XYZ accelerometer 1108. An interrupt can also be generated if a user programmable event occurs. User programmable events may include or combine specific acceleration values from the XYZ accelerometer 1108 or specific rate values from the Z-gyroscope 1106. The source of the interrupt can be determined via the SPI/I2C interface 1136.

Figure 12:
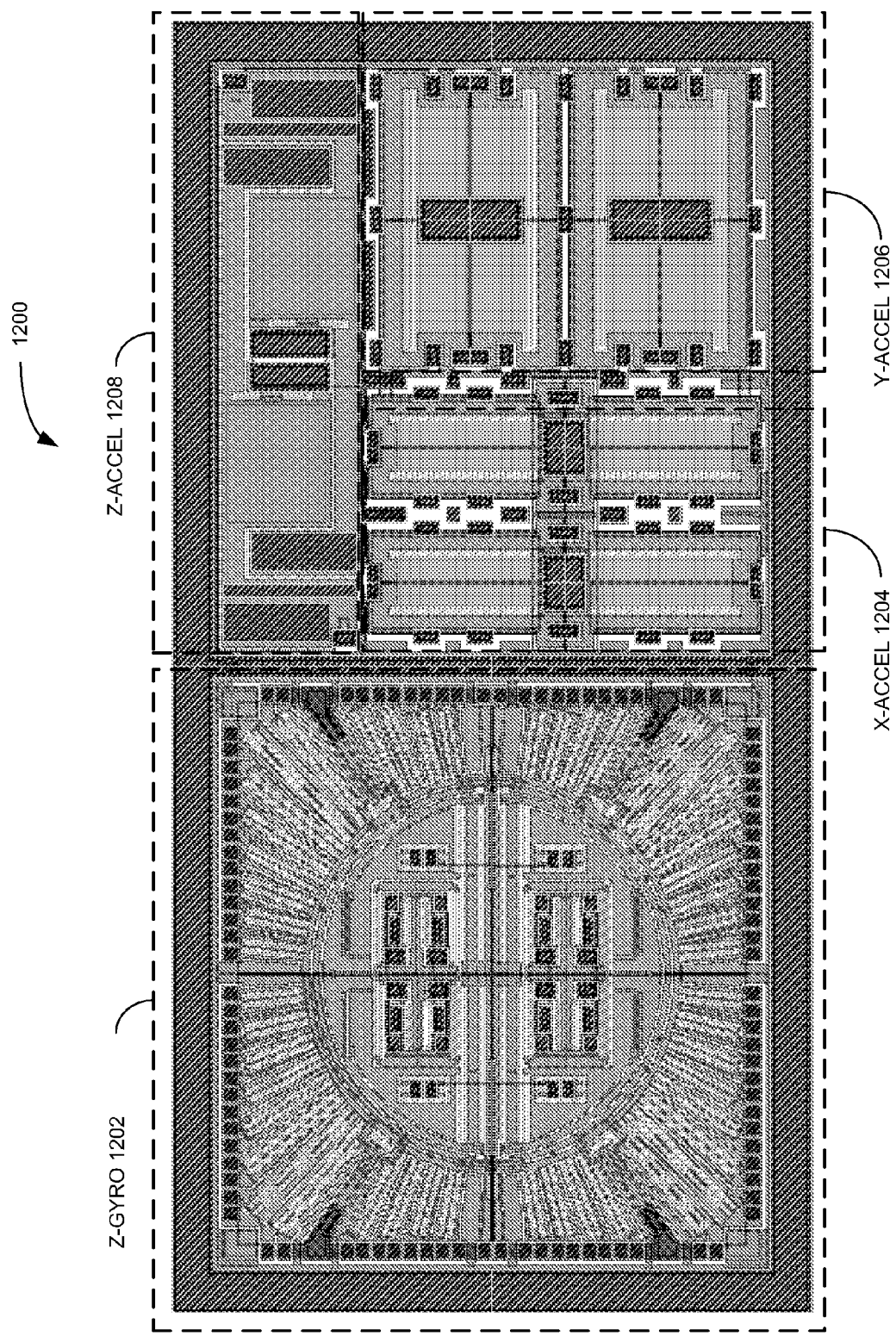
FIG. 12 shows an example die area of the module 1102 in the motion processing unit (MPU) of FIG. 11.

FIG. 12 illustrates a die layout 1200 of the motion processing unit 1102 of FIG. 11 according to one implementation. In one implementation, the die layout 1200 has a size of approximately 1.4 mm by 2.7 mm. Specifically, the die layout 1200 show a layout of a Z-gyroscope 1202, and an XYZ accelerometer including an X-accelerometer 1204, a Y-accelerometer 1206, and a Z-accelerometer 1208.

Figure 13A:
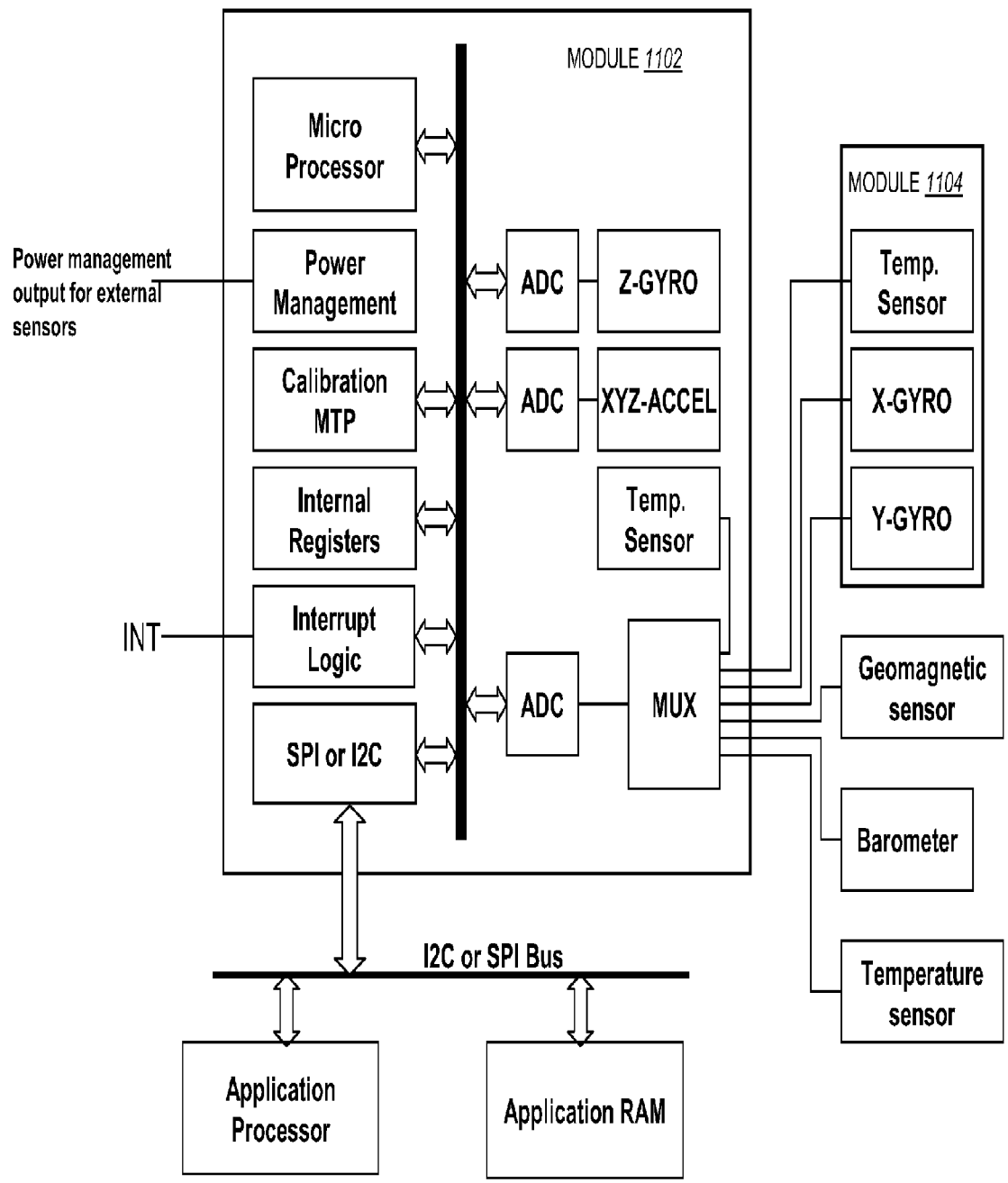
FIGS. 13A-13E illustrate various implementations of a motion processing unit (MPU).
Figure 13B:
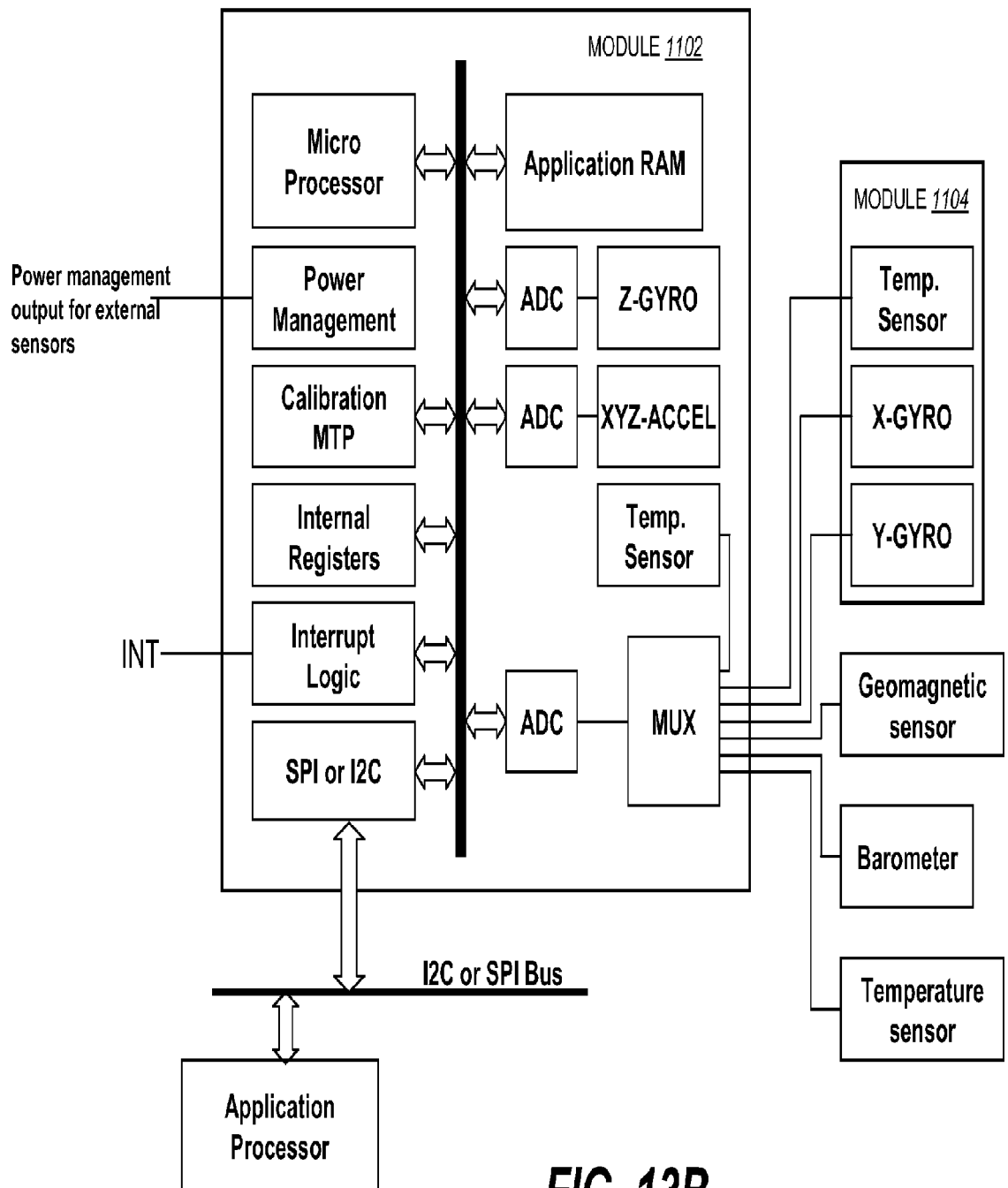
Figure 13C:
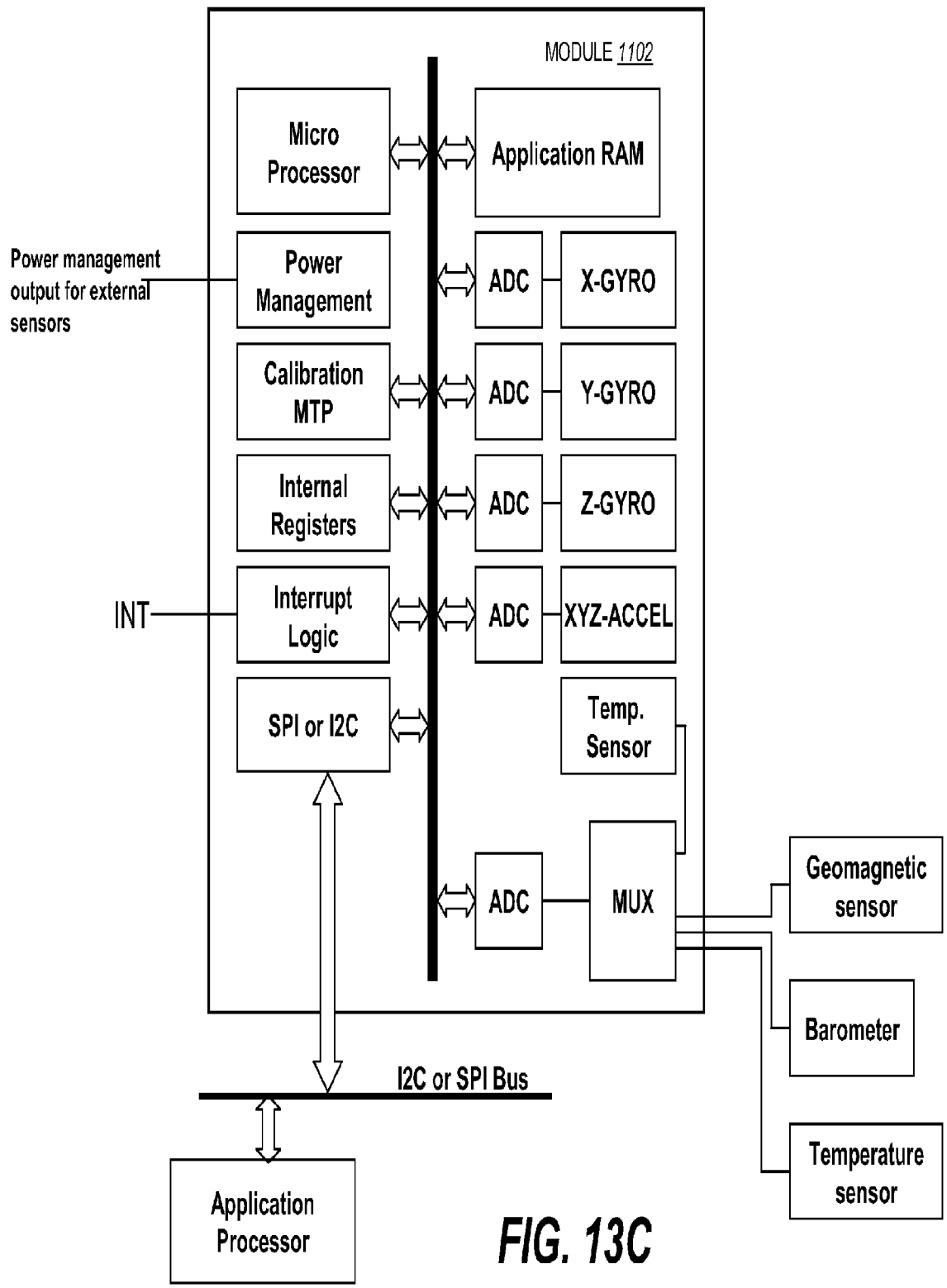
Figure 13D:
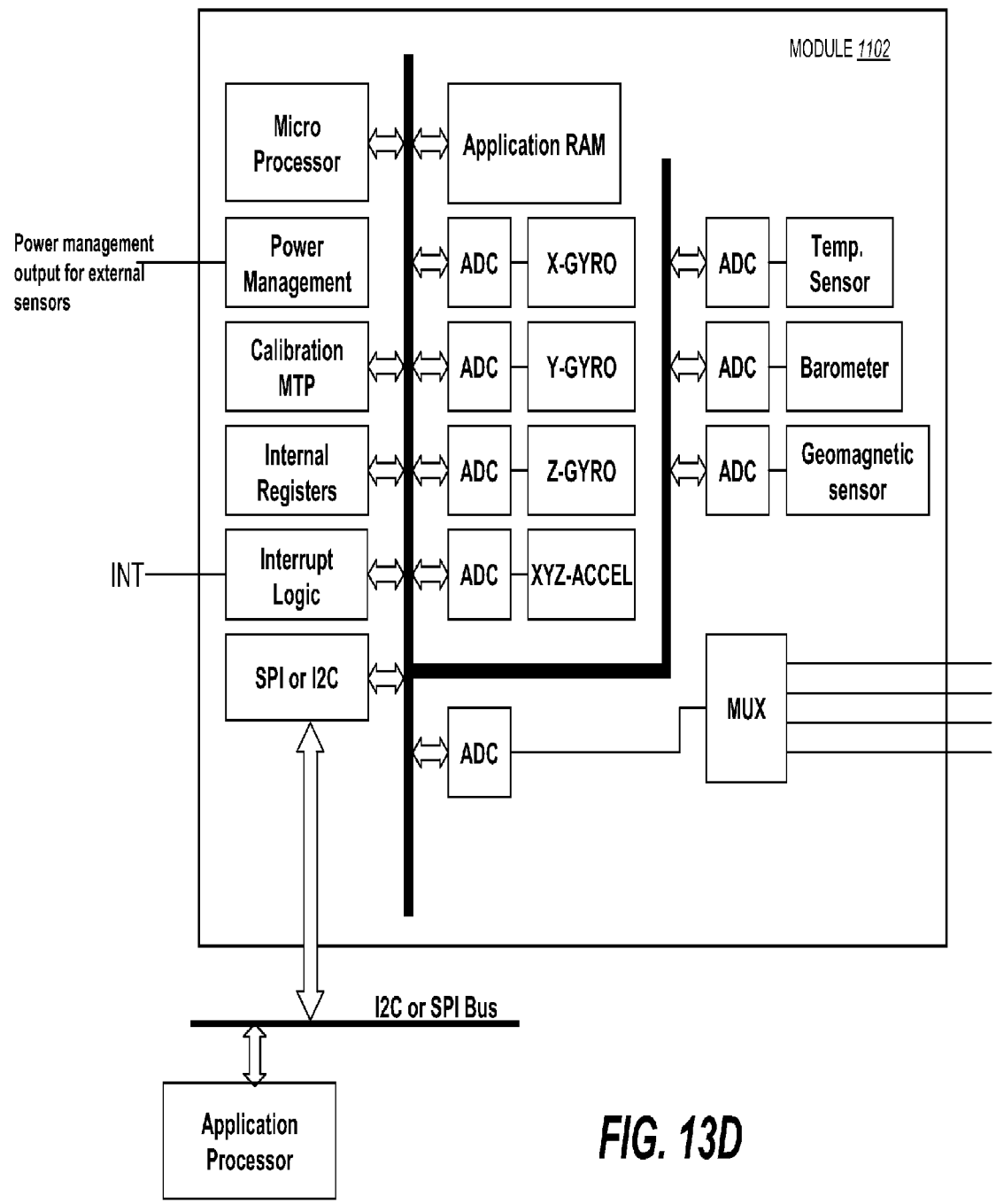
Figure 13E:
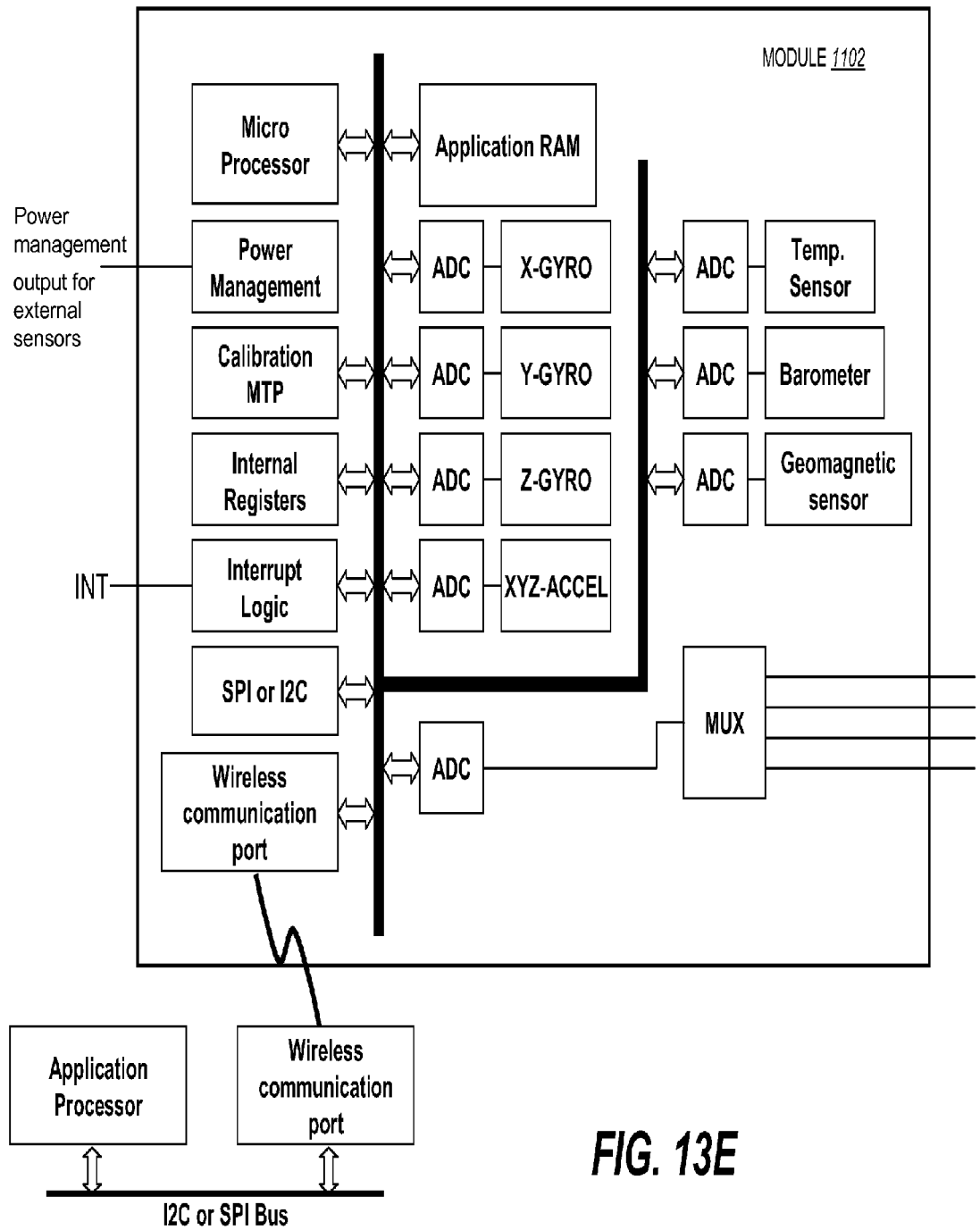

FIGS. 13A-13E illustrate different implementation of a motion processing unit. Other implementations and configurations other than those shown in FIGS. 13A-13E can also be implemented based on application requirements. In particular, FIG. 13A illustrates one implementation of module 1102 including a microprocessor. FIG. 13B illustrates one implementation of module 1102 including a microprocessor and application RAM. FIG. 13C illustrates one implementation of module 1102 including all the sensors of module 1104 (FIG. 11). In the implementation of FIG. 13C, all the sensors are formed onto a same substrate. FIG. 13D illustrates one implementation of module 1102 further including auxiliary sensors—e.g., a geomagnetic sensor, a barometer, and a temperature sensor. FIG. 13D illustrates one implementation of module 1102 including a wireless communication port operable to send and receive wireless communication.

Various applications for a motion processing unit and other implementations of modules described above, will now be described.

Optical Image Stabilization

In one implementation, a dual-axis or tri-axis gyroscope may be combined with a computation unit (e.g., a microcontroller), and an ADC to form an optical image stabilization system. The computation unit can output a position compensation value determined by high-pass filtering, integrating, and scaling an output from the gyroscope. The position compensation value can be used to determine the position of, e.g., a lens or image sensor of a camera system, and permit hand jitter to be compensated for during still image or video capture. In one implementation, the computation unit can be loaded with a scale factor corresponding to the number of pixels per degree. The scale factor can change depending on the zoom of the camera system. In addition, the optical image stabilization system can further include a driver for driving an actuator that compensates for the hand jitter that occurs during image capture. In one implementation, the optical image stabilization system receives inputs from position sensors that determine the current location of the actuator. The position sensors can comprise Hall effect sensors or infrared sensors. In this case, the computation unit would also provide a control system for controlling the position of the actuator in real-time, using feedback from the position sensors. The inputs for the position sensors may include amplifiers, differential amplifiers, analog offset compensation for the amplifiers, and an ADC.

Electronic Image Stabilization

In one implementation, a computation unit can be designed for calculating information applicable for electronic image stabilization of video. In such an implementation, the computation unit can be loaded with a scale factor corresponding to the number of pixels per degree. The scale factor can change depending on the zoom of the camera system.

In one implementation, the computation unit can be used for calculating information applicable to still image stabilization—e.g., using a synchronization pin tied to a mechanical shutter or a frame valid line, the computation unit can determine the start and end times of exposure times. During exposure times, the computation unit would integrate the gyroscope data, generating a point spread function that determines the blur characteristics of the image.

Temperature Compensation

In one implementation, the computation unit may be used to provide temperature compensation for the motion sensors. This can be done by reading the temperature of a temperature sensor associated with the motion sensors, and adjusting bias or scale factors accordingly using, e.g., factory calibrated relationships. These relationships may be linear, or polynomial, and can be derived from look-up tables. In one implementation, when factory calibration is too costly, or when the temperature relationships are known to change over time, the computation unit may adjust the relationships between temperature and motion sensor parameters by updating the relationships when the motion sensor is known to be motionless. This may be especially effective when the motion sensor is in a device containing a battery that is being charged, as the sensor will be exposed to a series of different temperatures, allowing the temperature relationships to be updated.

Motion Sensing

In one implementation, the sensors maybe coupled with built-in logic (e.g., a computation unit) that determines when a given sensor is not moving. This can be done by measuring the magnitude of the signal over a period of a few seconds. If the sensor is not moving, the magnitude of the signal will correspond to the measurement noise of the sensor. In the case of gyroscopes, the bias of a gyroscope may be set to zero at this point. In one implementation, if motion is detected, the computation unit (including the entire module) may be powered down in the case that the module is battery powered. In addition, the threshold may be inverted and used to determine when the sensor has been picked up. For a module with both gyroscopes and accelerometers, it may be desirable to power down the gyroscopes when the sensors determine that no motion is present. In such an implementation, the accelerometers can remain powered on, and used to determine when motion is again present, at which point the gyroscopes may be turned on again. In one implementation, a programmable dead-zone may be used to lessen the effects of drift when the module (or device including the module) is not moving very much. In general, the built-in logic is configured to analyze data from sensors and perform pre-determined calculations—e.g., determine an orientation of the module.

In one implementation, the computation unit may integrate the gyroscope data to provide a calculation of angular position. The integration can include a reset function and a bias correction as an input. In one implementation, a sensitivity adjust function may be used, in which the computation unit operates on the sensitivity of the gyroscope with a pre-determined function using a linear or polynomial transform, or a look-up table. This allows the device to treat slow movement and fast movement differently. In one implementation, peak detection may be used to determine the time and magnitude of spikes in the sensor signals. This may be used to form a pedometer, by measuring time between spikes. It may also be used to provide input triggers, by separating spikes on different sensor axes and mapping them to various triggers. In one implementation, when gyroscopes are combined with accelerometers, a computation unit may be used to determine when the device has been dropped. For example, in one application, a hard drive head may be disengaged to prevent damage to the data on the hard drive upon detection that a laptop computer or hard drive has been dropped. The accelerometers may be analyzed to determine when freefall has occurred. Since freefall may be difficult to determine when a significant centripetal acceleration is present, the gyroscope data may be used to compensate for such centripetal acceleration.

In one implementation, the computation unit may include a gesture recognition engine in which look-up tables are filled with information relevant to particular gestures, and the motion sensor signals are analyzed to determine when and which gestures have occurred. In one implementation, in which gyroscopes and accelerometers are used, the gyroscope and accelerometer data may be fused to provide a better orientation sensor. The accelerometer data may be used as a tilt sensor by measuring the acceleration due to gravity. Such acceleration data may be used to update the gyroscope biases, to reduce the gyroscope drift. In one implementation, the gyroscope and accelerometer data may be fused to provide a 3 degree-of-freedom orientation sensor using, e.g., a Kalman filter or a complementary filter. The computation unit would output orientation and angular velocity using, e.g., Euler angles, rotation matrices, or quaternions. In one implementation, the combination of the gyroscope and accelerometer data may be used to provide a more accurate estimate of the direction of gravity. This data may be subtracted from the accelerometer data to provide linear and centripetal accelerations, which may be integrated to provide position. In one implementation, the computation unit may take magnetic field as an input. The magnetic field sensor data may be fused with the other motion sensor data to provide an advanced compass system or other direction-based system.

In one implementation the device can be used in conjunction with a GPS module for aiding in navigation. In mobile devices with location based services, GPS is used for tracking location, but is unreliable in urban settings. Gyroscopes can be used to track heading, and accelerometers can be used to determine the direction of gravity, and the linear acceleration of the navigation device. For pedestrian navigation systems, accelerometer data can be used to estimate steps and step length.

In one implementation, an external magnetic compass can be sampled in conjunction with the internal inertial sensors. In this case, accelerometers and gyroscopes can be used to measure pitch and roll for more accurate compassing. For high accuracy in timing measurements, an external pin may sample a clock signal put out by a GPS signal, allowing for accurate synchronization in complex systems that do not have tightly controlled timing.

Various implementations of a module including a gyroscope and an analog-to-digital converter (ADC) have been described. Nevertheless, various modifications may be made to the implementations. For example, the modules discussed above can be utilized within applications other than image stabilization applications (e.g., within binoculars, telephoto lenses, digital cameras, and the like). The analog-to-digital converters discussed above can provide a bit resolution other than 16 bits of resolution. In addition, with respect to the motion processing unit 900 of FIG. 9, the x-axis gyroscope 906 and the y-axis gyroscope 908 can be combined into one cell by incorporating dual axis measurement gyroscope, and replacing the freed block with another type of sensor element, such as, pressure sensor, or magnetic sensor, or yet a resonator and or microphone. Global positioning system (GPS) receivers, antenna, and amplifier can be integrated into a package to create a fully integrated AGPS (Assisted GPS) with dead-reckoning. Accordingly, many modifications may be made without departing from the scope of the present invention.

What is claimed is:

1. A device operable to be mounted onto a surface of a board, comprising:
   at least one gyroscope;
   at least one accelerometer, the at least one gyroscope and the at least one accelerometer communicably coupled to an application specific integrated circuit (ASIC) implemented on a silicon substrate, wherein the accelerometer and the gyroscope are vertically stacked and attached to the silicon and form a single chip;
   the at least one gyroscope is operable to provide the ASIC with first measurement outputs corresponding to measurement of rotation about three axes, wherein the three axes are orthogonal to each other;
   the at least one accelerometer is operable to provide the ASIC with second measurement outputs corresponding to measurement of linear acceleration along three axes, wherein the three axes are orthogonal to each other;
   the ASIC includes at least one analog to digital converter (ADC), a built-in logic, and a memory, wherein the ADC converts data related to the first measurement outputs and the second measurement outputs into digital data and the built-in logic processes the digital data.

2. The device of claim 1, wherein the built-in logic is configured to detect a rotational motion or linear motion and determine an axis of the rotation or linear motion.

3. The device of claim 1, wherein the built-in logic includes a system of programmable interrupts permitting a user to determine a source of interrupt.

4. The device of claim 1, wherein the built-in logic includes a power management circuit capable of turning off the at least one gyroscope or the at least one accelerometer in response to corresponding measurement outputs.

5. The device of claim 1, wherein the built-in logic includes a power management circuit capable of operating the at least one gyroscope or the at least one accelerometer at low power in response to the first measurement outputs and the second measurement outputs.

6. The device of claim 1, wherein the built-in logic includes a power management circuit capable of turning off the at least one gyroscope in response to the second measurement outputs or the first measurement outputs.

7. The device of claim 1, wherein the built-in logic includes a power management circuit capable of turning off the at least one accelerometer in response to the second measurement outputs or the first measurement outputs.

8. The device of claim 1, wherein
   the second measurement outputs from the at least one accelerometer provides linear acceleration information;
   the first measurement outputs from the at least one gyroscope provides centripetal acceleration information; and
   the built-in logic analyzes the first measurement outputs and the second measurement outputs to determine free fall.

9. The device of claim 1, wherein the built-in logic comprises a microcontroller, wherein the microcontroller performs an optical image stabilization calculation based on the digital data.

10. The device of claim 1, wherein the second measurement outputs from the at least one accelerometer and the built-in logic determine a number of steps and a step length in a pedestrian navigation system.

11. The device of claim 1, wherein the built-in logic includes a power management circuit capable of operating the at least one gyroscope or the at least one accelerometer at low power in response to the first measurement outputs and the second measurement outputs.

12. The device of claim 1, wherein distance is determined by subtracting gravity factor from the second measurement outputs and double integrating the second measurement outputs, where in the gravity factor is determined by the first measurement outputs and the second measurement outputs.

13. The device of claim 1, wherein the built-in logic determines heading based on the first measurement outputs.

14. The device of claim 1, wherein the built-in logic of the ASIC and the second measurement outputs from the at least one accelerometer determines a step count, velocity, and a step length.

15. The device of claim 1, the first measurement outputs from the at least one gyroscope or the second measurement outputs from the at least one accelerometer and the built-in logic determine gestures.

16. The device of claim 1, further comprising a barometer operable to provide third measurement output corresponding to pressure,
   wherein the barometer is communicably coupled to the ASIC,
   wherein the barometer is vertically stacked and attached to the silicon substrate.

17. The device of claim 16, further comprising at least one geomagnetic sensor operable to provide fourth measurement output corresponding to magnetic field strength,
wherein the at least one geomagnetic sensor is communicably coupled to the ASIC,
wherein the at least one geomagnetic sensor is vertically stacked and attached to the silicon substrate.

18. The device of claim 17, wherein the built-in logic includes a system of programmable interrupts permitting a user to determine a source of interrupt.

19. The device of claim 17, wherein the built-in logic provides orientation and altitude of the device.

20. The device of claim 17, further comprising a microphone operable to provide fifth measurement output corresponding to acoustic pressure,
wherein the microphone is communicably coupled to the ASIC,
wherein the microphone is vertically stacked and attached to the silicon substrate.

21. The device of claim 20, further comprising a temperature sensor operable to provide sixth measurement output corresponding to temperature,
wherein the temperature sensor is operable to provide the ASIC with sixth measurement output corresponding to measurement of temperature.

22. The device of claim 1, further comprising a microphone operable to provide third measurement output corresponding to acoustic pressure,
wherein the microphone is communicably coupled to the ASIC,
wherein the microphone is vertically stacked and attached to the silicon substrate.

23. A device operable to be mounted onto a surface of a board, comprising:
at least one gyroscope implemented on a first silicon substrate;
at least one barometer implemented on the first silicon substrate;
at least one accelerometer implemented on the first silicon substrate, the at least one gyroscope, the at least one barometer and the at least one accelerometer communicably coupled to an application specific integrated circuit (ASIC) implemented on a second silicon substrate, wherein the first and second silicon substrates are vertically stacked, attached and form a single chip;
the at least one gyroscope is operable to provide the ASIC with first measurement outputs corresponding to measurement of rotation about three axes, wherein the three axes are orthogonal to each other;
the at least barometer is operable to provide the ASIC with second measurement outputs corresponding to measurement of pressure;
the at least one accelerometer is operable to provide the ASIC with third measurement outputs corresponding to measurement of linear acceleration along three axes, wherein the three axes are orthogonal to each other;
the ASIC includes at least one analog to digital converter (ADC), a built-in logic, and a memory, wherein the ADC converts data related to the first measurement outputs, the second measurement outputs and the third measurement outputs into digital data and the built-in logic processes the digital data.

24. The device of claim 23, wherein the built-in logic includes a system of programmable interrupts permitting a user to determine a source of interrupt.

25. The device of claim 23, wherein the built-in logic provides orientation of the device and altitude .

26. A device operable to be mounted onto a surface of a board, comprising:
at least one gyroscope implemented on a first silicon substrate;
at least one geomagnetic sensor implemented on the first silicon substrate;
at least one accelerometer implemented on the first silicon substrate, the at least one gyroscope, the at least one geomagnetic sensor and the at least one accelerometer communicably coupled to an application specific integrated circuit (ASIC) implemented on a second silicon substrate, wherein the first and second silicon substrates are vertically stacked, attached and form a single chip;
the at least one gyroscope is operable to provide the ASIC with first measurement outputs corresponding to measurement of rotation about three axes, wherein the three axes are orthogonal to each other;
the at least one geomagnetic sensor is operable to provide the ASIC with second measurement outputs corresponding to measurement of magnetic field strength;
the at least one accelerometer is operable to provide the ASIC withthird measurement outputs corresponding to measurement of linear acceleration along three axes, wherein the three axes are orthogonal to each other;
the ASIC includes at least one analog to digital converter (ADC), a built-in logic, and a memory, wherein the ADC converts data related to the first measurement outputs, the second measurement outputs and the third measurement outputs into digital data and the built-in logic processes the digital data.

27. The device of claim 26, wherein the built-in logic includes a system of programmable interrupts permitting a user to determine a source of interrupt.

28. The device of claim 26, wherein the built-in logic provides orientation of the device.

29. The device of claim 26, wherein the at least one geomagnetic sensor provides the ASIC with second measurement outputs corresponding to measurement of magnetic field strength along 3 axes orthogonal to each other.

30. The device of claim 26, further comprising a barometer implemented on the first silicon substrate, wherein the barometer is operable to provide the ASIC with fourth measurement outputs corresponding to measurement of pressure.

31. The device of claim 30, further comprising a temperature sensor implemented on the first silicon substrate, wherein the temperature sensor is operable to provide the ASIC with fifth measurement output corresponding to measurement of temperature.

32. The device of claim 26, further comprising a microphone operable to provide fourth measurement output corresponding to acoustic pressure,
wherein the microphone is communicably coupled to the ASIC,
wherein the microphone is vertically stacked and attached to the first silicon substrate.

33. The device of claim 32, further comprising a barometer operable to provide with fifth measurement output corresponding to measurement of pressure,
wherein the barometer is communicably coupled to the ASIC,
wherein the barometer is vertically stacked and attached to the first silicon substrate.

34. A device operable to be mounted onto a surface of a board, comprising:
at least one gyroscope implemented on a first silicon substrate;

at least one microphone implemented on the first silicon substrate;

at least one accelerometer implemented on the first silicon substrate, the at least one gyroscope, the at least one microphone and the at least one accelerometer communicably coupled to an application specific integrated circuit (ASIC) implemented on a second silicon substrate, wherein the first and second silicon substrates are vertically stacked, attached and form a single chip;

the at least one gyroscope is operable to provide the ASIC with first measurement outputs corresponding to measurement of rotation about three axes, wherein the three axes are orthogonal to each other;

the at least one microphone is operable to provide the ASIC with second measurement outputs corresponding to measurement of acoustic pressure;

the at least one accelerometer is operable to provide the ASIC with third measurement outputs corresponding to measurement of linear acceleration along three axes, wherein the three axes are orthogonal to each other;

the ASIC includes at least one analog to digital converter (ADC), a built-in logic, and a memory, wherein the ADC converts data related to the first measurement outputs, the second measurement outputs and the third measurement outputs into digital data and the built-in logic processes the digital data.

35. The device of claim 1, wherein the built-in logic includes a power management circuit capable of turning on the at least one gyroscope in response to the second measurement outputs.

* * * * *